United States Patent
Raffegeau et al.

(10) Patent No.: US 11,811,437 B2
(45) Date of Patent: Nov. 7, 2023

(54) SELECTIVE SATELLITE SIGNAL MEASUREMENT

(71) Applicant: QUALCOMM Incorporated, San Diego, CA (US)

(72) Inventors: Jean-Pierre Raffegeau, Santa Clara, CA (US); Jordan Cookman, San Jose, CA (US); Daniel Carolin, San Diego, CA (US); Liang Zhao, Saratoga, CA (US); Angelica Wong, Palo Alto, CA (US); Jeffrey Wong, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 105 days.

(21) Appl. No.: 17/475,820

(22) Filed: Sep. 15, 2021

(65) Prior Publication Data

US 2023/0078666 A1  Mar. 16, 2023

(51) Int. Cl.
*H04B 1/04* (2006.01)
*H04B 1/10* (2006.01)
*H04W 72/541* (2023.01)

(52) U.S. Cl.
CPC ......... *H04B 1/0475* (2013.01); *H04B 1/0483* (2013.01); *H04B 1/1027* (2013.01); *H04W 72/541* (2023.01)

(58) Field of Classification Search
CPC ...... H04B 1/0475; H04B 1/0483; H04B 1/10; H04B 1/1027; H04B 1/1036; H04B 1/38; H04B 1/40; H04B 1/54; H04B 1/56; H04B 1/59; H04B 2001/1063; H04B 2001/1072; H04W 72/541
See application file for complete search history.

(56) References Cited

U.S. PATENT DOCUMENTS

| | | | | |
|---|---|---|---|---|
| 6,799,050 | B1* | 9/2004 | Krasner | H04B 1/3805 455/552.1 |
| 7,006,790 | B2* | 2/2006 | Bloebaum | G01S 19/30 455/13.2 |
| 10,481,273 | B1* | 11/2019 | Ulmer | H04B 1/711 |
| 10,616,768 | B2* | 4/2020 | Bull | H04L 5/023 |
| 11,035,960 | B1* | 6/2021 | Vazhenin | H04B 1/0007 |
| 11,463,071 | B2* | 10/2022 | Lennen | G01S 19/21 |
| 2019/0326886 | A1 | 10/2019 | Lennen | |

OTHER PUBLICATIONS

International Search Report and Written Opinion—PCT/US2022/040593—ISA/EPO—dated Nov. 30, 2022.
Tian Z., et al., "An Improved Frequency Domain Interference Suppressor for DBT Processing of High Order BOC Signals", ITM 2021—Proceedings of the 2021 International Technical Meeting of The Institute of Navigation, The Institute of Navigation, 8551 RIXLEW Lanesuite 360MANASSAS, VA 20109, USA, Jan. 28, 2021, XP056016393, pp. 555-566, Sections 1-6 Abstract, Figures 1-7.

* cited by examiner

*Primary Examiner* — Quochien B Vuong
(74) *Attorney, Agent, or Firm* — QUALCOMM Incorporated

(57) ABSTRACT

A satellite signal method includes: receiving a satellite signal at an apparatus; transmitting, from the apparatus, one or more outbound signals; and inhibiting processing, by the apparatus, of at least a first portion of the satellite signal spanning a first frequency set that includes at least a portion of an interference signal corresponding to transmission of the one or more outbound signals.

36 Claims, 14 Drawing Sheets

SELECTIVE SATELLITE SIGNAL MEASUREMENT

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example apparatus includes: a transceiver configured to receive a satellite signal and to transmit one or more outbound signals; a memory; and a processor, communicatively coupled to the transceiver and the memory, configured to: transmit, via the transceiver, the one or more outbound signals; and inhibit processing of at least a first portion of the satellite signal spanning a first frequency set that includes at least a portion of an interference signal corresponding to transmission of the one or more outbound signals by the transceiver.

Implementations of such an apparatus may include one or more of the following features. The first portion of the satellite signal is a frequency portion of the satellite signal, the apparatus further includes a frequency filter, and to inhibit processing of at least the first portion of the satellite signal, the processor is configured to actuate, based on transmission of the one or more outbound signals, the frequency filter to attenuate the portion of the interference signal and the first portion of the satellite signal. The first portion of the satellite signal is a frequency portion of the satellite signal, and the processor is configured to process a second portion of the satellite signal spanning a second frequency set, different from the first frequency set, to determine an arrival time of the satellite signal at the apparatus, where the first portion of the satellite signal and the second portion of the satellite signal are different frequency portions of a same time portion of the satellite signal. The satellite signal is a split-spectrum modulation signal including a first main lobe and a second main lobe, and the first frequency set includes a first portion of the second main lobe and the second frequency set includes a second portion of the second main lobe. The satellite signal is a split-spectrum modulation signal including a first main lobe and a second main lobe, and the first frequency set includes at least some of the second main lobe and the second frequency set excludes the second main lobe.

Also or alternatively, implementations of such an apparatus may include one or more of the following features. The first portion of the satellite signal is a frequency portion of the satellite signal, the apparatus further comprises a frequency filter, and to inhibit processing of at least the first portion of the satellite signal, the processor is configured to frequency shift, based on transmission of the one or more outbound signals, the interference signal to produce a frequency-shifted interference signal such that the frequency-shifted interference signal is in a higher-attenuation frequency span of the frequency filter than the interference signal. The first portion of the satellite signal is a time portion of the satellite signal, and to inhibit processing of at least the first portion of the satellite signal, the processor is configured to blank the satellite signal for a time period corresponding to transmission of the one or more outbound signals based on one or more sub-bands of the one or more outbound signals.

An example satellite signal method includes: receiving a satellite signal at an apparatus; transmitting, from the apparatus, one or more outbound signals; and inhibiting processing, by the apparatus, of at least a first portion of the satellite signal spanning a first frequency set that includes at least a portion of an interference signal corresponding to transmission of the one or more outbound signals.

Implementations of such a method may include one or more of the following features. The first portion of the satellite signal is a frequency portion of the satellite signal, and inhibiting processing of at least the first portion of the satellite signal includes actuating, based on transmission of the one or more outbound signals, a frequency filter to attenuate the portion of the interference signal and the first portion of the satellite signal. The first portion of the satellite signal is a frequency portion of the satellite signal, and the method further includes processing a second portion of the satellite signal spanning a second frequency set, different from the first frequency set, to determine an arrival time of the satellite signal at the apparatus, where the first portion of the satellite signal and the second portion of the satellite signal are different frequency portions of a same time portion of the satellite signal. The satellite signal is a split-spectrum modulation signal including a first main lobe and a second main lobe, and the first frequency set includes a first portion of the second main lobe and the second frequency set includes a second portion of the second main lobe. The satellite signal is a split-spectrum modulation signal including a first main lobe and a second main lobe, and the first frequency set includes at least some of the second main lobe and the second frequency set excludes the second main lobe.

Also or alternatively, implementations of such a method may include one or more of the following features. The first portion of the satellite signal is a frequency portion of the satellite signal, and inhibiting processing of at least the first portion of the satellite signal includes: frequency shifting, based on transmission of the one or more outbound signals, the interference signal to produce a frequency-shifted interference signal such that the frequency-shifted interference signal is in a higher-attenuation frequency span of a frequency filter of the apparatus than the interference signal; and applying the frequency filter to the frequency-shifted interference signal. The first portion of the satellite signal is a time portion of the satellite signal, and inhibiting processing of at least the first portion of the satellite signal comprises blanking the satellite signal for a time period corresponding to transmission of the one or more outbound signals based on one or more sub-bands of the one or more outbound signals.

Another example apparatus includes: means for receiving a satellite signal; means for transmitting one or more outbound signals; and means for inhibiting processing, by the apparatus, of at least a first portion of the satellite signal spanning a first frequency set that includes at least a portion of an interference signal corresponding to transmission of the one or more outbound signals.

Implementations of such an apparatus may include one or more of the following features. The first portion of the satellite signal is a frequency portion of the satellite signal, and the means for inhibiting processing of at least the first portion of the satellite signal include means for actuating, based on transmission of the one or more outbound signals, a frequency filter to attenuate the portion of the interference signal and the first portion of the satellite signal. The first portion of the satellite signal is a frequency portion of the satellite signal, and the apparatus further includes means for processing a second portion of the satellite signal spanning a second frequency set, different from the first frequency set, to determine an arrival time of the satellite signal at the apparatus, where the first portion of the satellite signal and the second portion of the satellite signal are different frequency portions of a same time portion of the satellite signal. The satellite signal is a split-spectrum modulation signal including a first main lobe and a second main lobe, and the first frequency set includes a first portion of the second main lobe and the second frequency set includes a second portion of the second main lobe. The satellite signal is a split-spectrum modulation signal including a first main lobe and a second main lobe, and the first frequency set includes at least some of the second main lobe and the second frequency set excludes the second main lobe.

Also or alternatively, implementations of such an apparatus may include one or more of the following features. The first portion of the satellite signal is a frequency portion of the satellite signal, and the means for inhibiting processing of at least the first portion of the satellite signal include: means for frequency shifting, based on transmission of the one or more outbound signals, the interference signal to produce a frequency-shifted interference signal such that the frequency-shifted interference signal is in a higher-attenuation frequency span of a frequency filter of the apparatus than the interference signal; and means for applying the frequency filter to the frequency-shifted interference signal. The first portion of the satellite signal is a time portion of the satellite signal, and the means for inhibiting processing of at least the first portion of the satellite signal include means for blanking the satellite signal for a time period corresponding to transmission of the one or more outbound signals based on one or more sub-bands of the one or more outbound signals.

An example non-transitory, processor-readable storage medium includes processor-readable instructions to cause a processor of an apparatus to: receive a satellite signal; transmit one or more outbound signals; and inhibit processing, by the apparatus, of at least a first portion of the satellite signal spanning a first frequency set that includes at least a portion of an interference signal corresponding to transmission of the one or more outbound signals.

Implementations of such a storage medium may include one or more of the following features. The first portion of the satellite signal is a frequency portion of the satellite signal, and the processor-readable instructions to cause the processor to inhibit processing of at least the first portion of the satellite signal include processor-readable instructions to cause the processor to actuate, based on transmission of the one or more outbound signals, a frequency filter to attenuate the portion of the interference signal and the first portion of the satellite signal. The first portion of the satellite signal is a frequency portion of the satellite signal, and the storage medium further includes processor-readable instructions to cause the processor to process a second portion of the satellite signal spanning a second frequency set, different from the first frequency set, to determine an arrival time of the satellite signal at the apparatus, where the first portion of the satellite signal and the second portion of the satellite signal are different frequency portions of a same time portion of the satellite signal. The satellite signal is a split-spectrum modulation signal including a first main lobe and a second main lobe, and the first frequency set includes a first portion of the second main lobe and the second frequency set includes a second portion of the second main lobe. The satellite signal is a split-spectrum modulation signal including a first main lobe and a second main lobe, and the first frequency set includes at least some of the second main lobe and the second frequency set excludes the second main lobe.

Also or alternatively, implementations of such a storage medium may include one or more of the following features. The first portion of the satellite signal is a frequency portion of the satellite signal, and the processor-readable instructions to cause the processor to inhibit processing of at least the first portion of the satellite signal include: processor-readable instructions to cause the processor to frequency shift, based on transmission of the one or more outbound signals, the interference signal to produce a frequency-shifted interference signal such that the frequency-shifted interference signal is in a higher-attenuation frequency span of a frequency filter of the apparatus than the interference signal; and processor-readable instructions to cause the processor to apply the frequency filter to the frequency-shifted interference signal. The first portion of the satellite signal is a time portion of the satellite signal, and the processor-readable instructions to cause the processor to inhibit processing of at least the first portion of the satellite signal include processor-readable instructions to cause the processor to blank the satellite signal for a time period corresponding to transmission of the one or more outbound signals based on one or more sub-bands of the one or more outbound signals.

DETAILED DESCRIPTION

Figure 1:
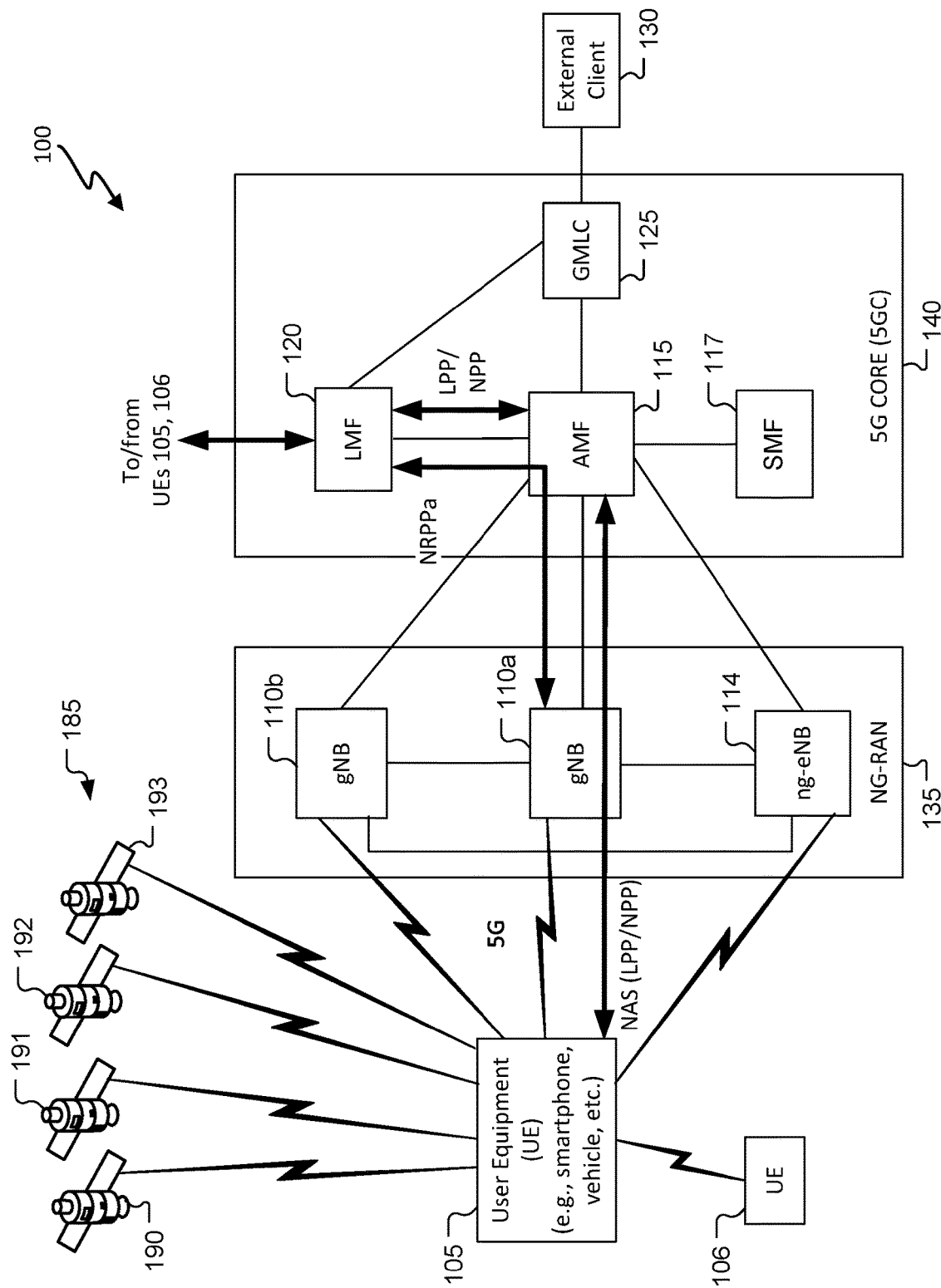
FIG. 1 is a simplified diagram of an example wireless communications system.

Techniques are discussed herein for measuring a satellite signal in the presence of interference. For example, a device may transmit one or more outbound signals (e.g., communication signals) that may produce one or more interference signals (e.g., signal harmonic(s), intermodulation distortion signal(s)) at one or more interference frequencies that may interfere with inbound satellite signals. The device may measure a portion (e.g., a frequency portion or a time portion) of the satellite signal and inhibit measurement of another portion (frequency portion or time portion) of the satellite signal based on the interference being present or expected to be present. The device may determine whether the interference is present, or expected to be present, based on transmission times of (times during which the device transmits (e.g., is transmitting or is scheduled to transmit)) the outbound signal(s). The device may, for example, measure a first frequency portion of the satellite signal to find a correlation peak while not measuring a second frequency portion (containing the interference signal(s)) of the same time portion of the satellite signal as the first frequency portion corresponding to transmission time of the outbound signal(s). The correlation peak (from correlation of the satellite signal with a reference signal) may be used to determine an arrival time of the satellite signal, which may be used to determine a location of the device. As another example, the device may blank the satellite signal (e.g., not measuring any of the satellite signal) for transmission time of the outbound signal(s). These are examples, and other examples may be implemented.

Items and/or techniques described herein may provide one or more of the following capabilities, as well as other capabilities not mentioned. Positioning and/or time determination accuracy may be improved, e.g., by measuring a non-interfered with portion of a satellite signal while excluding an interfered-with portion of the satellite signal from being measured, or by blanking satellite signal measurements based on transmission of outbound signals that may induce satellite signal interference without blanking the satellite signal in the presence of outbound signal transmission that does not induce satellite signal interference. Better interference signal rejection may be provided. Selectively blanking of a satellite signal based on sub-band(s) of one or more transmitted (e.g., WWAN (Wireless Wide Area Network)) signals may help avoid processing satellite signals with interference (e.g., improving measurement accuracy and/or reducing measurement latency) while avoiding blanking of SV signals based on outbound signal transmissions (e.g., of WWAN signals) that will not significantly interfere with the SV signals. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Obtaining the locations of mobile devices may be useful for many applications including, for example, emergency calls, personal navigation, consumer asset tracking, locating a friend or family member, etc. Positioning methods include methods based on measuring radio signals transmitted from a variety of devices or entities including satellite vehicles (SVs) and terrestrial radio sources in a wireless network such as base stations and access points.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11 (Institute of Electrical and Electronics Engineers 802.11 standard), etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or a local or regional SPS such as the Indian Regional Navigational Satellite System (IRNSS), the European Geostationary Navigation Overlay Service (EGNOS), the Wide Area Augmentation System (WAAS), or the Quasi-Zenith Satellite System (QZSS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device.

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies to determine and/or provide location information for the UE 105. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

With a UE-based position method, the UE 105 may obtain location measurements and may compute a location of the UE 105 (e.g., with the help of assistance data received from a location server such as the LMF 120 or broadcast by the gNBs 110*a*, 110*b*, the ng-eNB 114, or other base stations or APs). The UE 105 may use SPS signal measurements to determine a Coordinated Universal Time (UTC). The UE 105 may provide the location of the UE 105 to a server, e.g., directly and/or via a base station, such that the server can provide location information to a location client.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP (LTE Positioning Protocol) and/or NPP (New Radio Positioning Protocol) message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (Observed Time Difference Of Arrival) (or some other position method).

Figure 2:
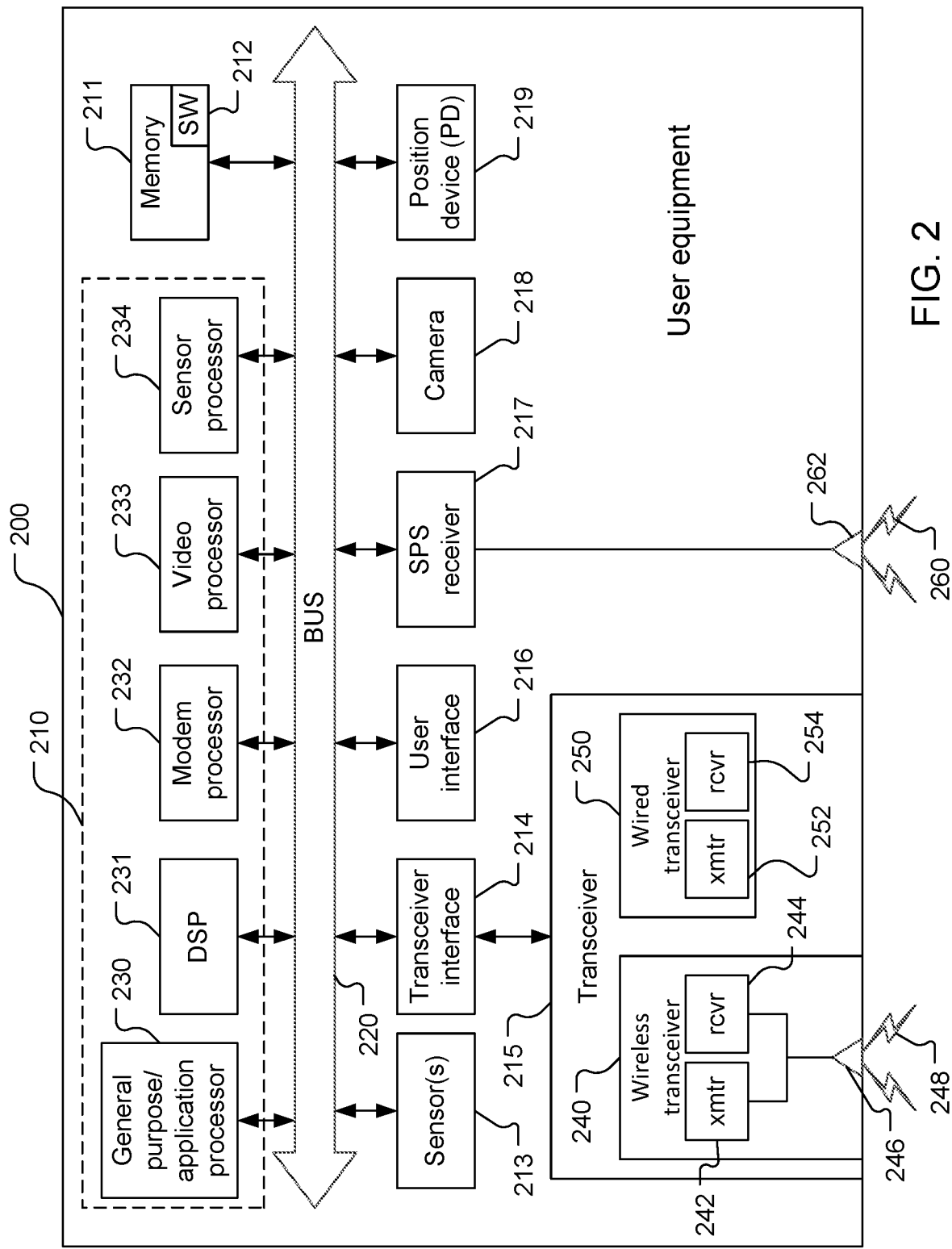
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (Vehicle-to-Everything) (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the network 135 to send communications to, and receive communications from, the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
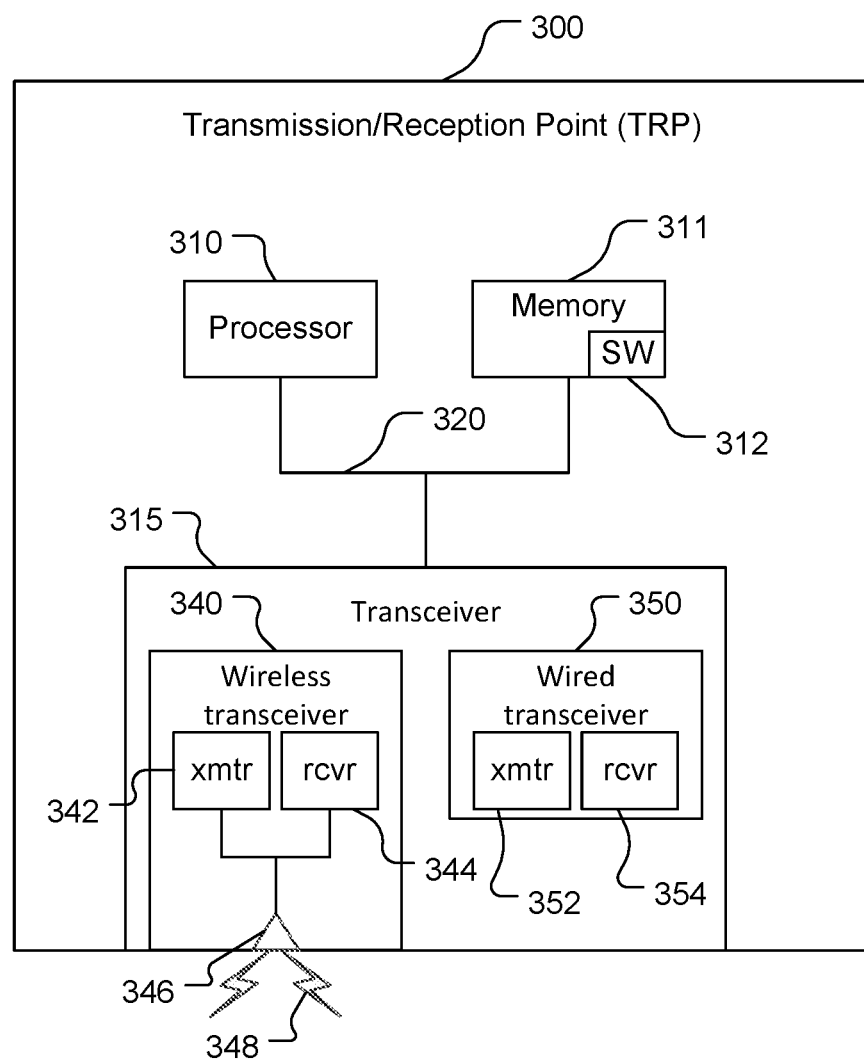
FIG. 3 is a block diagram of components of an example transmission/reception point.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110*a*, 110*b*, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
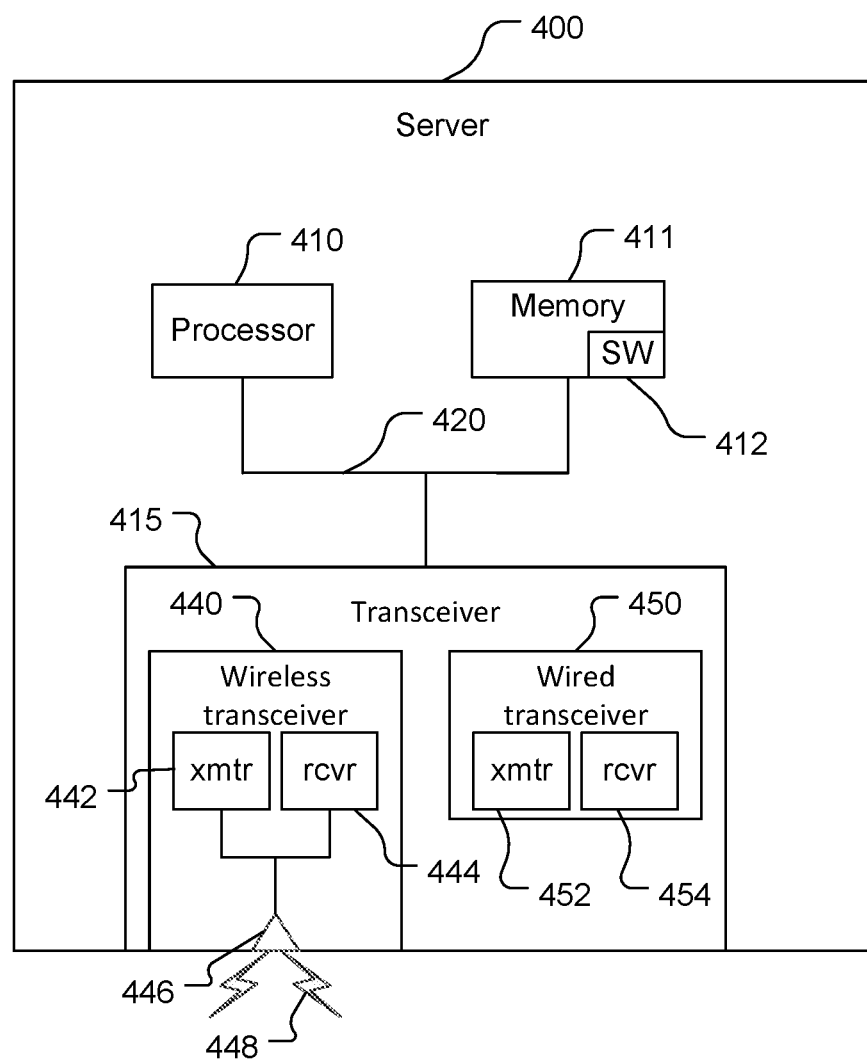
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer only to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

SPS Positioning Techniques

Figure 5:
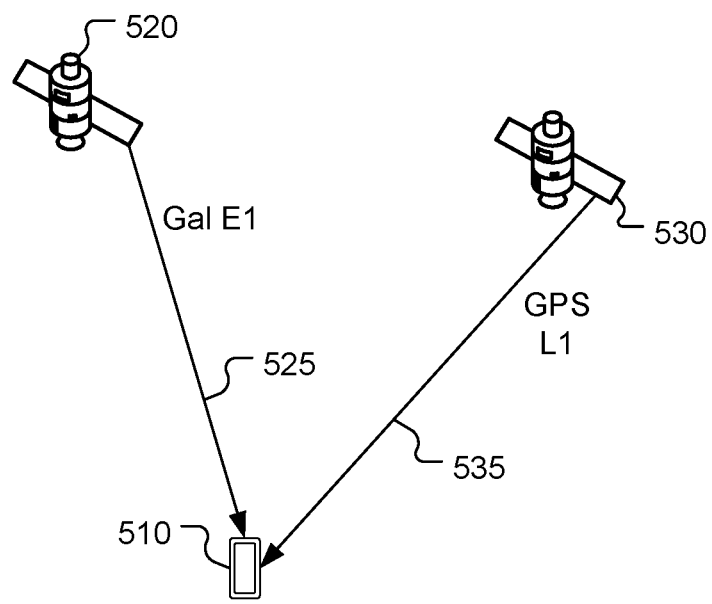
FIG. 5 is a simplified diagram of a user equipment receiving satellite signals.

Referring to FIG. 5, a UE 510 (here, a smartphone) may measure signals from one or more Satellite Positioning Systems (SPS) (Global Navigation Satellite Systems (GNSS)) to determine a position of the UE. For example, the UE 200 may be an example of the UE 510, and the SPS receiver 217 of the UE 510 may measure a signal 535 from a GPS satellite 530 of the GPS (Global Positioning System) SPS and measure a satellite signal 525 from a Galileo satellite 520 of the Galileo SPS. The UE 510 may measure signals from other GPS satellites and/or other Galileo satellites not shown, and/or signals from satellites of other SPS not shown, e.g., GLONASS, etc. The Galileo system is defined for 50 pseudo random noise (PRN) (code phase) sequences with three carrier frequencies, labeled E1, E5, and E6. The Galileo E1 (GAL E1) carrier frequency is 1575.42 MHz, which is the same carrier frequency for the GPS L1 signal. The GAL E1 signal uses composite binary offset carrier (CBOC) modulation including both BOC(1,1) and BOC(6,1) modulations. The BOC(1,1) component of the Galileo E1 signal comprises $10/11$ of the power of the E1 signal and the BOC(6,1) component comprises $1/11$ of the power of the E1 signal. The GAL E1 signal has the two modulations (BOC(1,1) and BOC(6,1)) and two codes, one for data and one for a pilot. The data code is referred to as E1-B and is an in-phase signal while the pilot code is referred to as E1-C and is an anti-phase signal. The GAL E1-B and E1-C codes may be generated from a look-up table at 1.023 MHz sample rate for 4 ms, with each code having 4,092 chips. The GAL E1-B signal has a symbol bit every 4 ms for a convolutionally-encoded message and the GAL E1-C signal has an overlay code of 25 bits for 100 ms.

Figure 6:
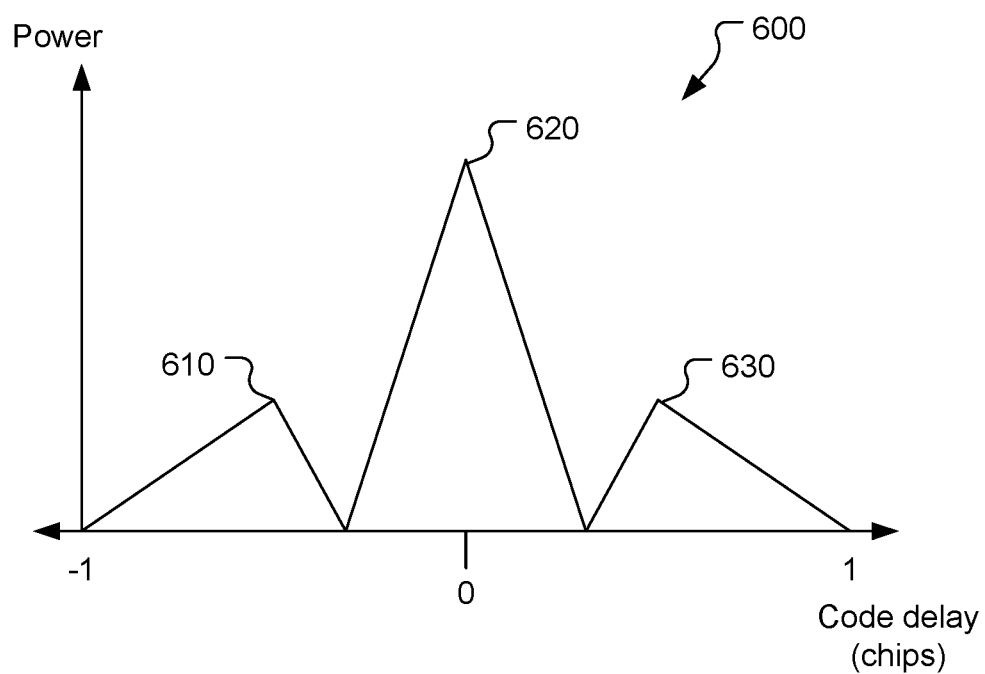
FIG. 6 is a simplified diagram of correlation peaks obtained by correlating a BOC-modulated signal.

Satellite signals may be measured by the UE 510 in that the UE 510 may correlate the satellite signals with reference PN codes (pseudorandom noise codes) for the respective satellites of the respective SPS. The UE 510 alters the timing of the reference signal to determine one or more correlation peaks with corresponding timings. Referring also to FIG. 6, the BOC(1,1) signal generates three correlation peaks 610, 620, 630 in a correlation plot 600. By finding a correlation peak in corresponding to a known PN code and an incoming satellite signal, the UE 510 can determine an arrival time of the signal, from which the UE 510 can determine a travel time of the signal, from which the UE 510 can determine a distance between the UE 510 and the transmitting satellite.

The UE 510 may repeat this process for multiple satellites. The UE 510 may use known positions in the sky of the satellites and the determined distances to determine a location of the UE 510.

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

SV Signal Measurement Based on Interference

In mobile devices such as smartphones, where small size and low cost is desired, close proximity of GNSS (circuitry and associated antennas) and WWAN (Wireless Wide Area Network), WLAN, BT, and/or other wireless technologies is common. Consequently, antenna-to-antenna isolation may be poor, resulting in interference into the GNSS spectrum, especially during transmit operation of one or more non-GNSS technologies where power levels are much higher, typically, than received signals. For example, as WWAN, WLAN, and BT are terrestrial-based technologies, the power levels of these technologies may be many tens of dB higher than GNSS signals (being satellite based). Examples of interference signals include second or higher-order harmonics of signals in other frequency bands, signals with fundamental frequencies (which may be called first harmonics) in the frequency band of the signal to be measured, and/or one or more intermodulation signals (also called intermodulation distortion signals) with frequencies (e.g., the frequency sum and/or difference of multiple signals) in the frequency band of the signal to be measured. While the discussion herein may focus on harmonics as interference signals, the discussion is applicable to other types of interference signals such as intermodulation signals. Apparatus, e.g., a UE, may be configured, as discussed herein, to measure satellite signals (also called satellite vehicle (SV) signals) while adapting to interference, or possible interference.

Figure 7:
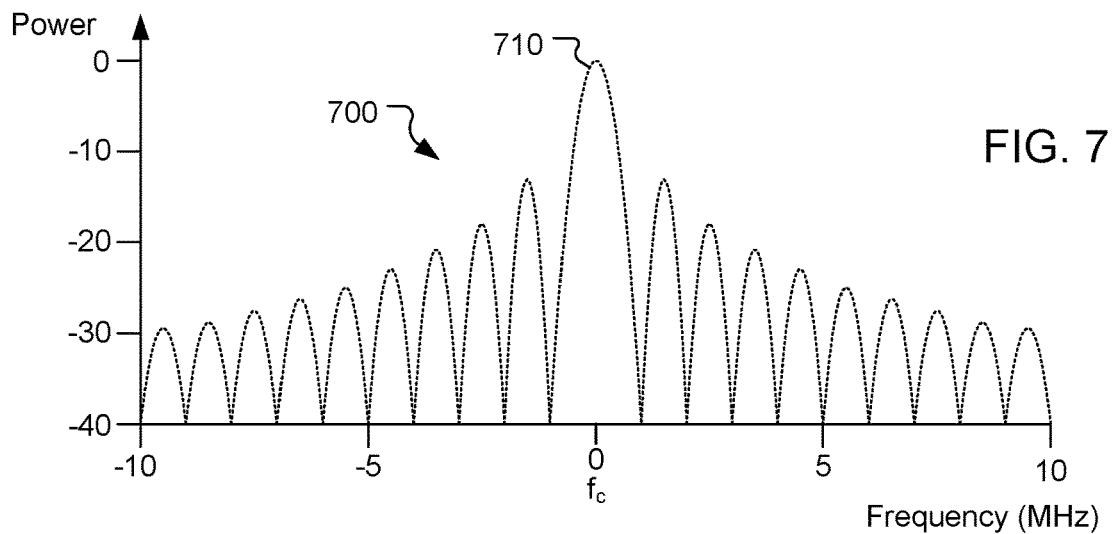
FIG. 7 is a diagram of power distribution of a BPSK-modulated GPS satellite signal as a function of frequency.
Figure 8:
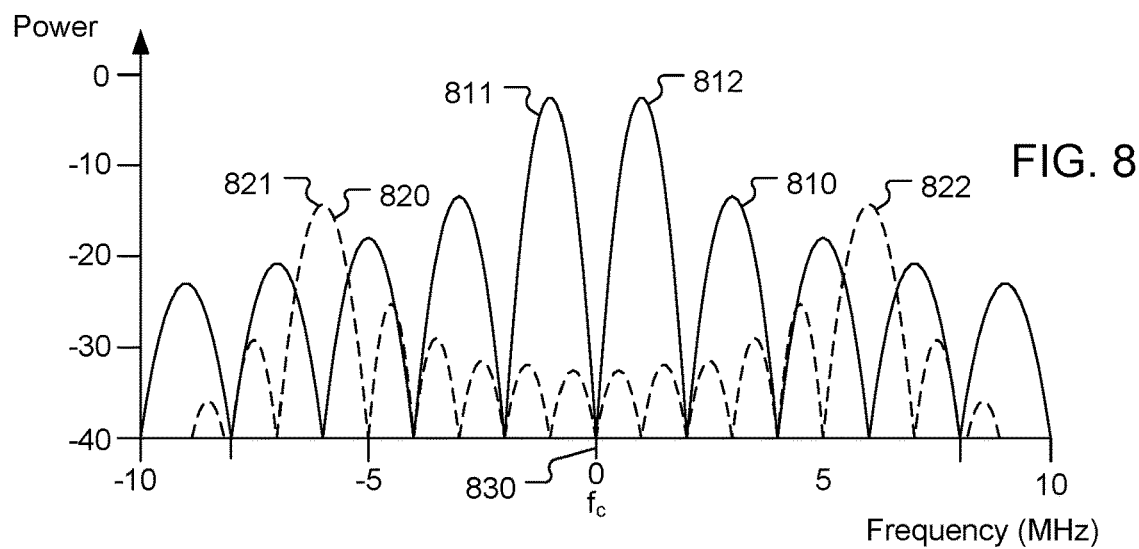
FIG. 8 is a diagram of power distribution of BOC-modulated Galileo satellite signal components as a function of frequency.
Figure 9:
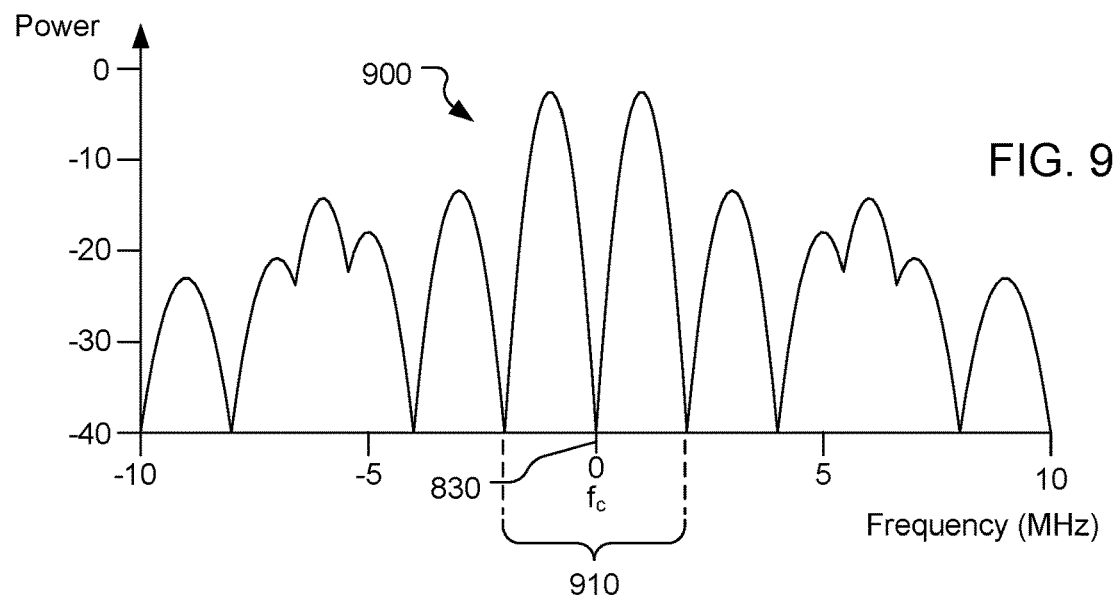
FIG. 9 is a diagram of power distribution of a composite BOC-modulated Galileo satellite signal as a function of frequency.
Figure 10:
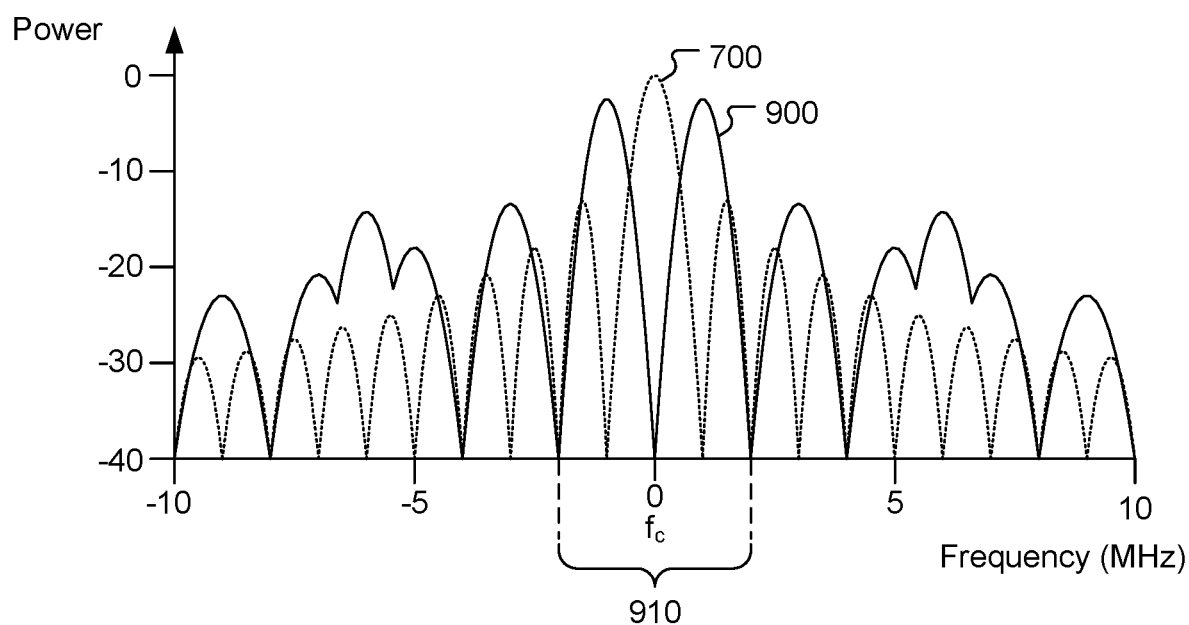
FIG. 10 is a diagram of a superposition of the power distribution shown in FIG. 7 and the power distribution shown in FIG. 9.

BOC-modulated signals, such as the GAL E1 signal, are called split-spectrum signals as the modulation changes the signal from a single-main-lobe signal to a multi-main-lobe signal, with the multiple main lobes spanning different frequency spectra. For example, referring to FIGS. 7 and 8, a BPSK-modulated (binary phase-shift keying modulated) signal 700, such as the GPS L1 signal has a single main lobe 710, whereas a BOC(1,1) signal 810 has two main lobes 811, 812 adjacent to a center frequency 830 of the signal 810 and a BOC(6,1) signal 820 has two main lobes 821, 822 spaced well away from the center frequency 830. The two main lobes 811, 812 are centered at −1.023 MHz and +1.023 MHz, respectively, and energies of the two main lobes 811, 812 are 3 dB less than the energy of the main lobe 710. Referring also to FIG. 9, the signals 810, 820 shown in FIG. 8 are components of a GAL E1 signal 900, with the BOC(1,1) signal 810 comprising 10/11 of the power of the E1 signal 900 and the BOC(6,1) signal 820 comprises 1/11 of the power of the E1 signal 900. A bandpass filter may be applied to the GAL E1 signal 900 to pass energy (e.g., a main part of energy of a signal) in a band 910 spanning +/−2 MHz of the center frequency 830, which will effectively allow processing of just the main part of the BOC(1,1) signal 810 for determining signal arrival time. Referring also to FIG. 10, a GPS L1 signal 1010 may be filtered along with the GAL E1 signal 900 by a bandpass filter to pass energy in the band 910, with energy in the band 910 being sufficient for each of the signals 700, 810 for correlation with good sensitivity.

BOC modulation provides an opportunity to process portions of a BOC-modulated signal independently. For a Cx4 (chip rate times four) sampling rate, four samples per chip are taken at a sample rate of 4.092 MHz. BOC(1,1) modulation is equivalent to upsampling a PN sequence (of a sequence of chips with values of +1 or −1), replacing each +1 chip with [+1 −1] and each −1 chip with [−1 +1]. To sample at four times the chip rate, the BOC values are repeated for correlation. Thus, for BOC(1,1) at Cx4, each +1 or −1 chip in the PN sequence is multiplied by [+1 +1 −1 −1] to get the Cx4 sequence for correlation. A GAL E1$_{B\ or\ C}$ code generator at Cx4 with BOC modulation of 4 ms may be given by $$BOC\_E1_{B\ or\ C}[1:4092]_{at\ cx4} = BPSK\_E1_{B\ or\ C}[1:4092]_{at\ cx4}.*\text{repmat}([+1\ +1\ -1\ -1],4092) \quad (1)$$

where repmat is a Matlab® command that repeats elements of an array in an output and ".*" is element-by-element multiplication. At Cx4, repmat([+1 +1 −1 −1]) is equivalent to two sub-carriers at +/−1.023 MHz such that $$repmat([+1+1-1-1], 1, 4092) = \quad (2)$$

$$\left(e^{j(\frac{\pi}{2}*[0:4091]-\frac{\pi}{4})} + e^{-j(\frac{\pi}{2}*[0:4091]-\frac{\pi}{4})}\right)/\sqrt{2}$$

$$= \left(e^{j(2\pi*\frac{+1.023\ MHz}{4.092\ MHz}*[0:4091]-\frac{\pi}{4})} + e^{j(2\pi*\frac{-1.023\ MHz}{4.092\ MHz}*[0:4091]+\frac{\pi}{4})}\right)/\sqrt{2} \quad (3)$$

The BOC E1$_{B\ or\ C}$ correlation is the sum of two BPSK correlations at +/−1.023 MHz as given by $$BOC\_E1_{B\ or\ C}[1:4092]_{at\ cx4} = BPSK\_E1_{B\ or\ C}[1:4092]_{at\ cx4}.* \quad (4)$$

$$\left(e^{j(2\pi*\frac{+1.023\ MHz}{4.092\ MHz}*[0:4091]-\frac{\pi}{4})} + e^{j(2\pi*\frac{-1.023\ MHz}{4.092\ MHz}*[0:4091]+\frac{\pi}{4})}\right)/\sqrt{2}$$

While each BPSK E1$_{B\ or\ C}$ correlation power is 3 dB less than the BOC E1$_{B\ or\ C}$ correlation power, there is a possibility to process, independently, each signal at +/−1.023 MHz with BPSK modulation.

Figure 11:
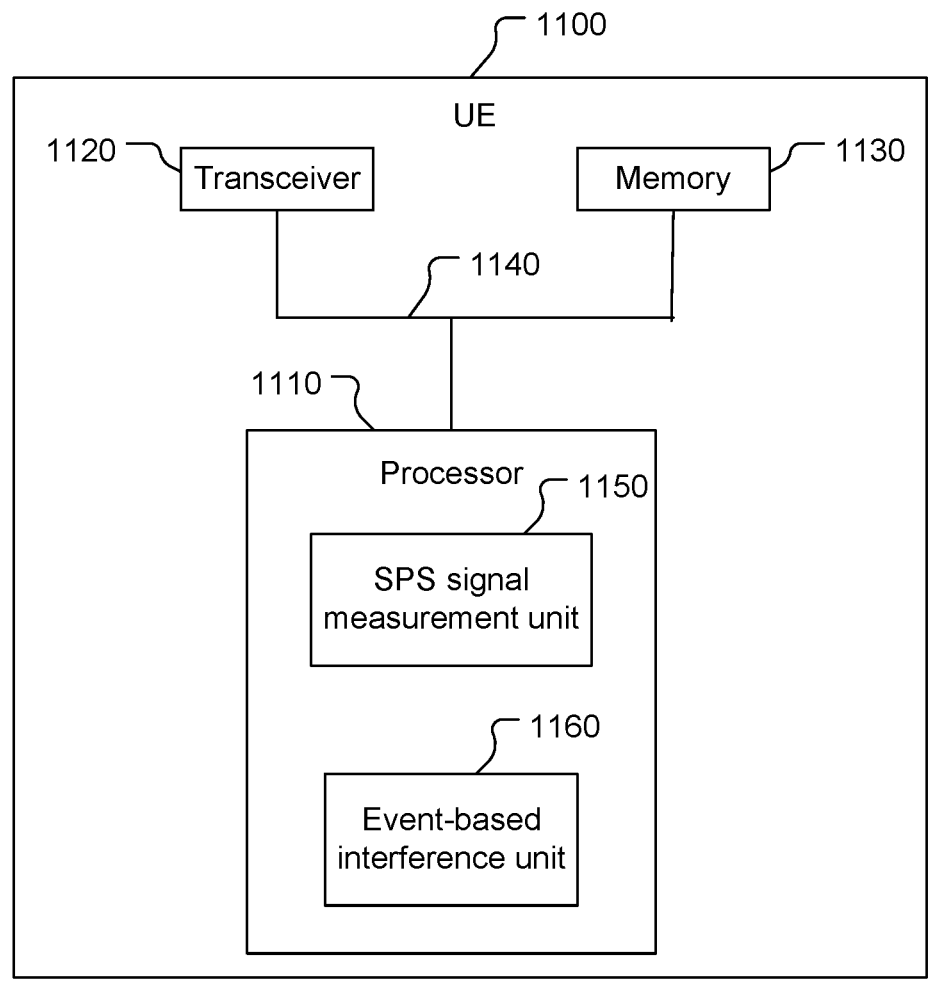
FIG. 11 is a simplified block diagram of an example user equipment.

Referring to FIG. 11, with further reference to FIG. 2, a UE 1100 includes a processor 1110, a transceiver 1120, and a memory 1130 communicatively coupled to each other by a bus 1140. The UE 1100 may include the components shown in FIG. 11, and may include one or more other components such as any of those shown in FIG. 2 such that the UE 200 may be an example of the UE 1100. For example, the processor 1110 may include one or more of the components of the processor 210. The transceiver 1120 may include the antenna 262 and one or more components of the SPS receiver 217, and may include one or more components of the transceiver 215, e.g., the wireless transmitter 242 and the antenna 246, or the wireless receiver 244 and the antenna 246, or the wireless transmitter 242, the wireless receiver 244, and the antenna 246, or the wired transmitter 252 and/or the wired receiver 254. The memory 1130 may be configured similarly to the memory 211, e.g., including software with processor-readable instructions configured to cause the processor 1110 to perform functions. The UE 510 may be an example of the UE 1100.

The description herein may refer only to the processor 1110 performing a function, but this includes other implementations such as where the processor 1110 executes software (stored in the memory 1130) and/or firmware. The description herein may refer to the UE 1100 performing a function as shorthand for one or more appropriate components (e.g., the processor 1110 and the memory 1130) of the UE 1100 performing the function. The processor 1110 (possibly in conjunction with the memory 1130 and, as appropriate, the transceiver 1120) may include an SPS signal measurement unit 1150, and an event-based interference unit 1160. The event-based interference unit 1160 may be configured to affect the signals processed by the SPS signal measurement unit 1150 based on outbound signal transmission by the UE 1100, e.g., outbound WWAN signal transmission. The event-based interference unit 1160 may, for example, be configured to adjust attenuation applied to incoming signals and/or to selectively blank incoming SV signals. The SPS signal measurement unit 1150 and the event-based interference unit 1160 are discussed further below, and the description may refer to the processor 1110 generally, or the UE 1100 generally, as performing any of the functions of the SPS signal measurement unit 1150 and/or the event-based interference unit 1160.

Event-based interference is interference that is induced by the occurrence of an event and is repeatable such that the interference induced by the event is known (e.g., of known frequency(ies) and magnitude(s)). The event-based interference unit 1160 may have knowledge of the event-based interference, e.g., both the interference and the event that induces the interference. For example, the event-based interference may be Tx interference due to transmission of one or more signals by the UE 1100, in which case the event-based interference unit 1160 obtains knowledge of occurrence of the event from another portion of the processor 1110, e.g., that controls transmission of communication signals. The event-based interference unit 1160 may not have knowledge of the interference induced by an event, but have knowledge of what action to take to avoid negative effects of the interference, e.g., what measurement(s) to use and what measurement(s) not to use during the event. The event-based interference unit 1160 may determine that Tx interference is presently occurring (e.g., from a notice of Tx transmission) and/or may determine the time of future Tx interference (e.g., from a Tx schedule). The event-based interference unit 1160 may obtain an indication of an interference-inducing event from another portion of the UE 1100 and/or from outside of the UE 1100 (e.g., via the transceiver 1120). The interference occurs at one or more known frequencies and/or in one or more known ranges of frequencies. Multiple events may occur that each induce interference and one or more interference-inducing events may end, causing the event-induced interference to end.

Figure 12:
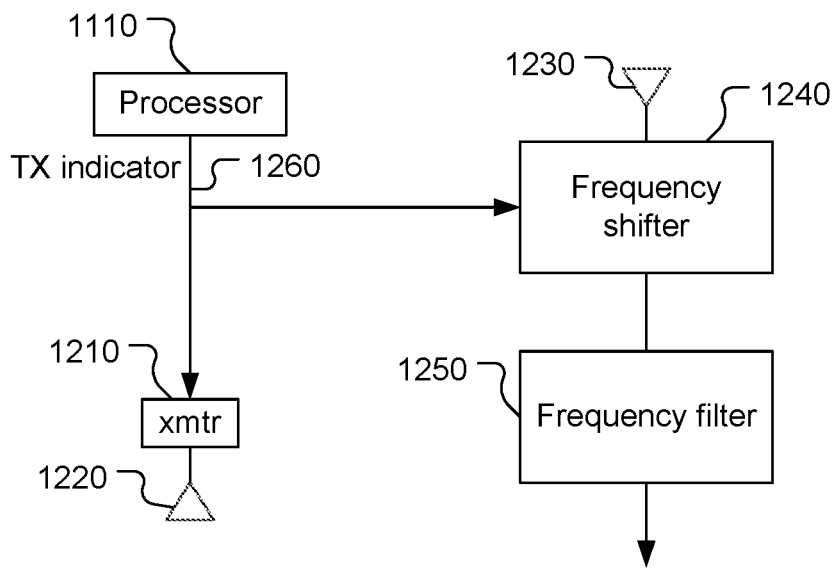
FIG. 12 is a block diagram of frequency shifting and filtering components of the user equipment shown in FIG. 11.

Referring also to FIG. 12, the UE 1100 may be configured to frequency shift SV signals and interference signals and to filter the frequency-shifted signals. The UE 1100, e.g., the transceiver 1120, may include a transmitter 1210 (e.g., the wireless transmitter 242), an antenna 1220 (e.g., the antenna 246), an SPS antenna 1230 (e.g., the SPS antenna 262), a frequency shifter 1240, and a frequency filter 1250. The transmitter 1210 and the antenna 1220 are configured to transmit outbound signals, e.g., WWAN signals (e.g., data, communications, etc.) based on a transmission indicator signal 1260. The TX indicator signal 1260 indicates timing and frequency of outbound signal transmission. The SPS antenna 1230 is configured to receive SV signals. The frequency filter 1250 is configured to provide attenuation that has an attenuation profile as a function of frequency. The frequency shifter 1240 is configured to selectively apply, or not apply, frequency shifting based on what, if any, interference may be present for one or more SV signals corresponding to the TX indicator signal 1260.

Figure 13:
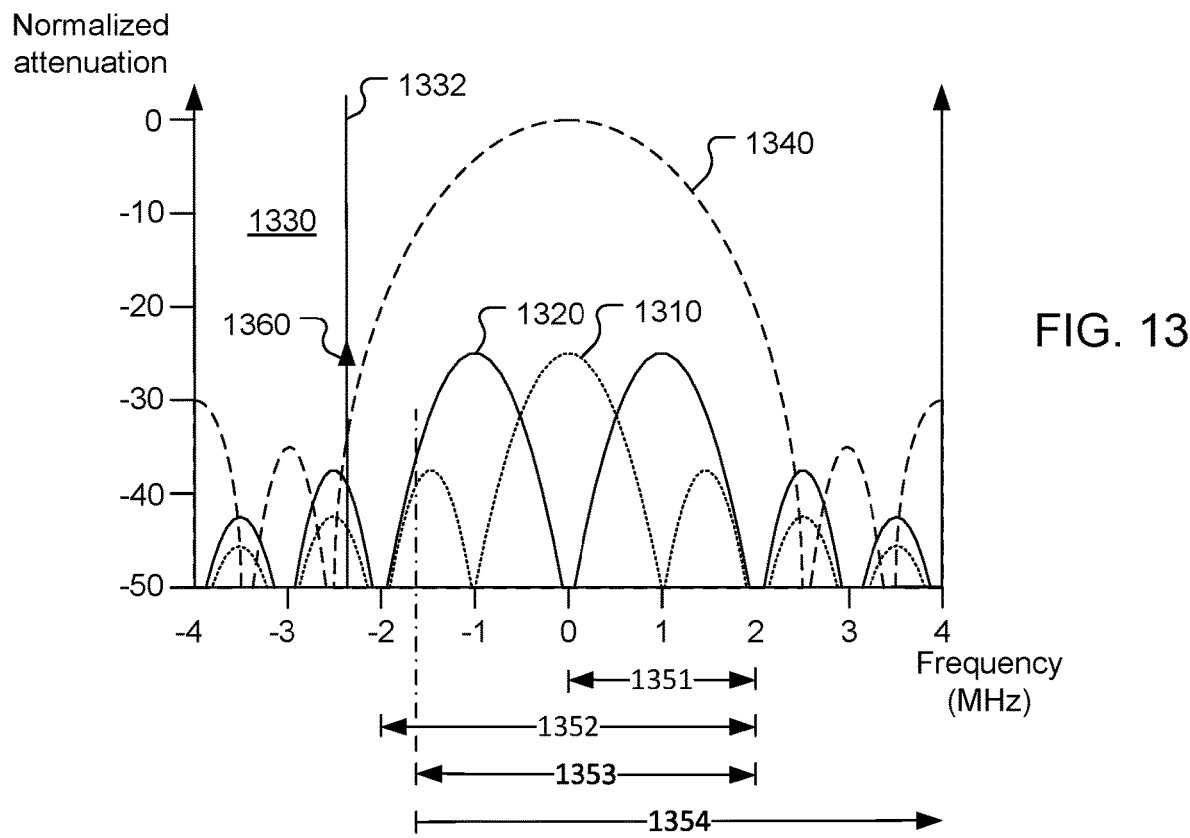
FIG. 13 is a diagram of normalized power distribution of the power distributions shown in FIGS. 7 and 9, a lower-frequency interference region, and an attenuation pattern.

Referring also to FIG. 13, the transmitter 1210 and the antenna 1220 may transmit signals of various frequencies, some of which may cause interference with one or more SV signals received by the SPS antenna 1230. A central bandwidth of +/−4 MHz of each of a normalized GPS L1 signal 1310 and a normalized GAL E1 signal 1320 are shown (i.e., with a center frequency of the signals 1310, 1320 at 0 MHz). The transmitter 1210 and the antenna 1220 may transmit one or more outbound signals that produce one or more signals (e.g., an interference signal 1360) with frequency(ies) in a region 1330, below about −2.3 MHz from the center frequency, that may interfere with the signals 1310, 1320. For example, a second harmonic of a transmit signal in the B13 frequency band may interfere with signals in the region 1330. The frequency filter 1250 provides an attenuation 1340 to signals received by the SPS antenna 1230. The frequency filter 1250 may, for example, be an LTE frequency filter to help guard against interference due to LTE signal transmission. An interference signal in the region 1330, especially near an edge 1332 of the region 1330, may interfere with portions of the signals 1310, 1320 more than desired. To help increase the attenuation of such an interference signal, the frequency shifter 1240 is configured to respond to the TX indicator signal 1260 indicating transmission of one or more signals that may induce interference with one or more of the signals 1310, 1320 by selectively shifting, as appropriate (e.g., if appropriate and in an appropriate direction), frequency of signals received by the SPS antenna 1230.

Figure 14:
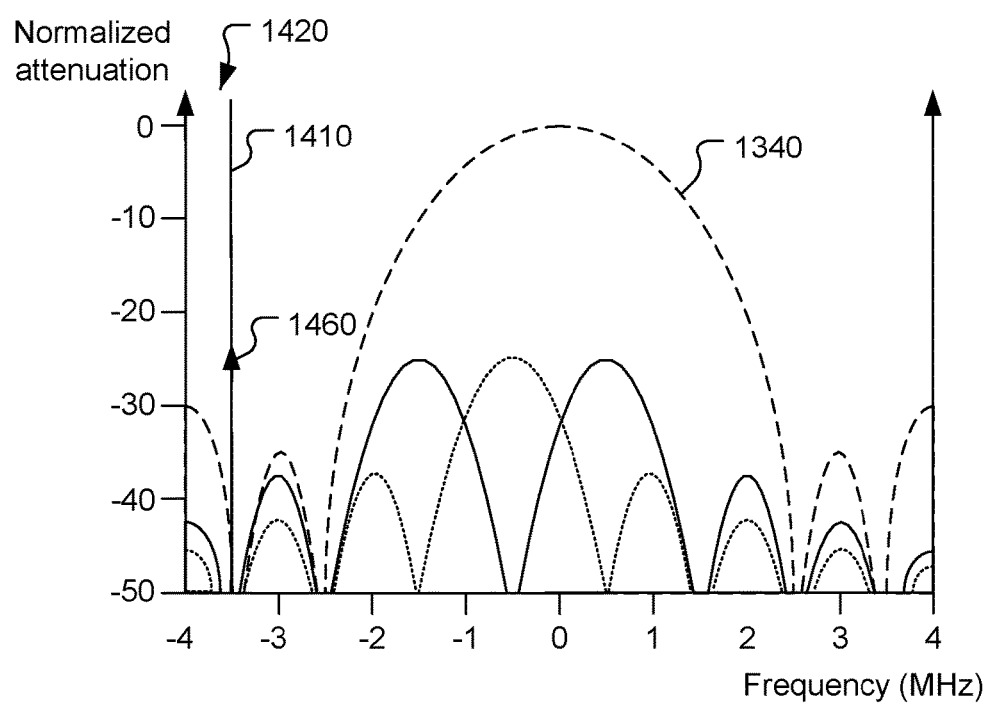
FIG. 14 is a diagram of the attenuation pattern shown in FIG. 13, and the normalized power distributions and interference region shown in FIG. 13 frequency shifted downward.

Referring also to FIG. 14, the frequency shifter 1240 is configured to shift signals received by the SPS antenna 1230 downward in frequency based on the TX indicator signal 1260 indicating transmission of one or more outbound signals that may induce interference in a lower frequency range of the signals 1310, 1320, e.g., in the region 1330. The frequency shifter 1240 may accomplish this frequency shift by, for example, increasing a down-converter frequency of a down converter that processes the signals 1310, 1320, and would-be interference signals. In this example, the frequency shifter 1240 has shifted the signals 1310, 1320 downward 511.5 kHz (although other magnitudes of frequency shift may be used). Consequently, a new edge 1410 of a region 1420 of potential interference signals (e.g., a frequency-shifted interference signal 1460, which is the interference signal 1360 after frequency shifting) has been moved to a higher-attenuation portion (e.g., −50 dB or greater) than the edge 1332 (e.g., about −34 dB). Without the frequency shift, processing of both main lobes of the GAL E1 signal 1320 may include interference and thus result in poor accuracy of a determined position for the UE 1100 and/or poor accuracy of determined time. With the frequency shift, the UE 1100 may process both main lobes of the GAL E1 signal 1320, providing more energy processed, a better-resolution correlation peak and thus a better accuracy of a time of arrival of the signal 1320 and consequently a more accurate position estimate for the UE 1100. Also or alternatively, with the frequency shift, a time determined by processing both main lobes of the GAL E1 signal 1320 may be more accurate.

Figure 15:
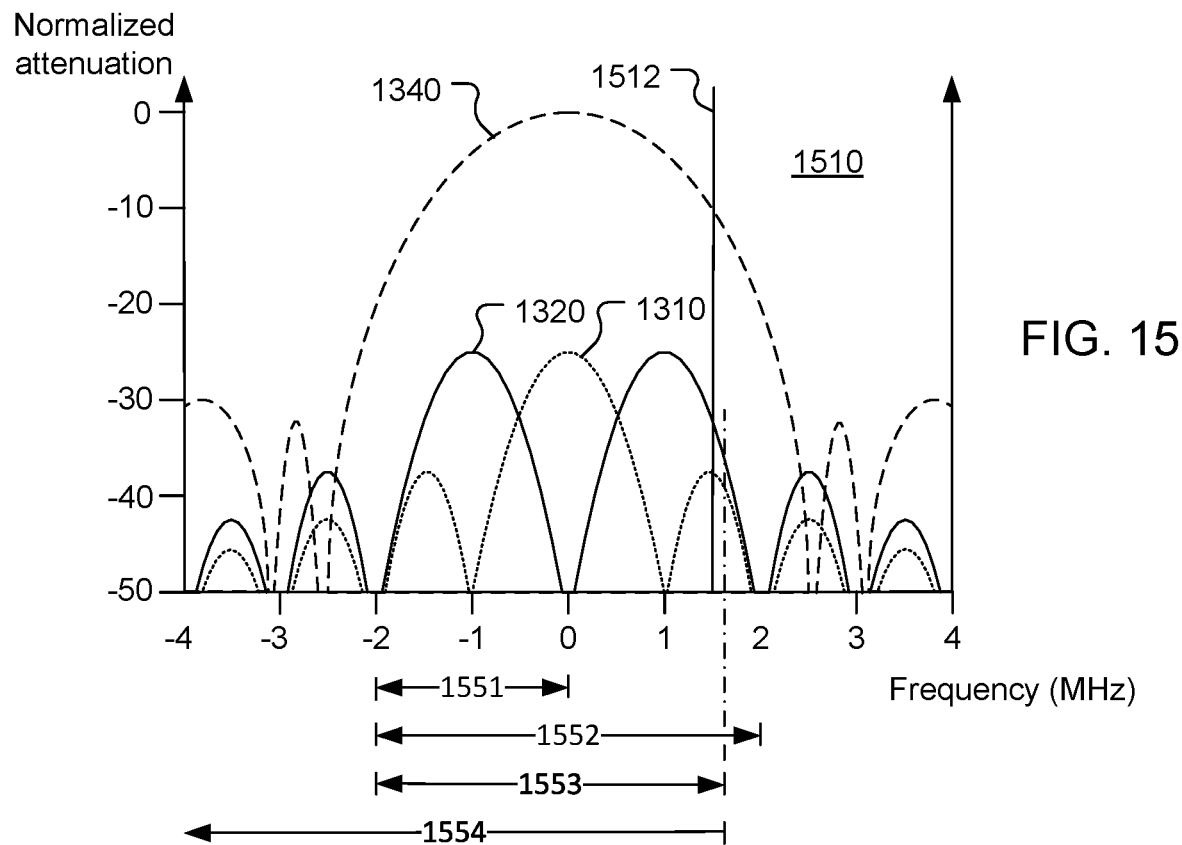
FIG. 15 is a diagram of normalized power distribution of the power distributions shown in FIGS. 7 and 9, an upper-frequency interference region, and the attenuation pattern shown in FIG. 13.
Figure 16:
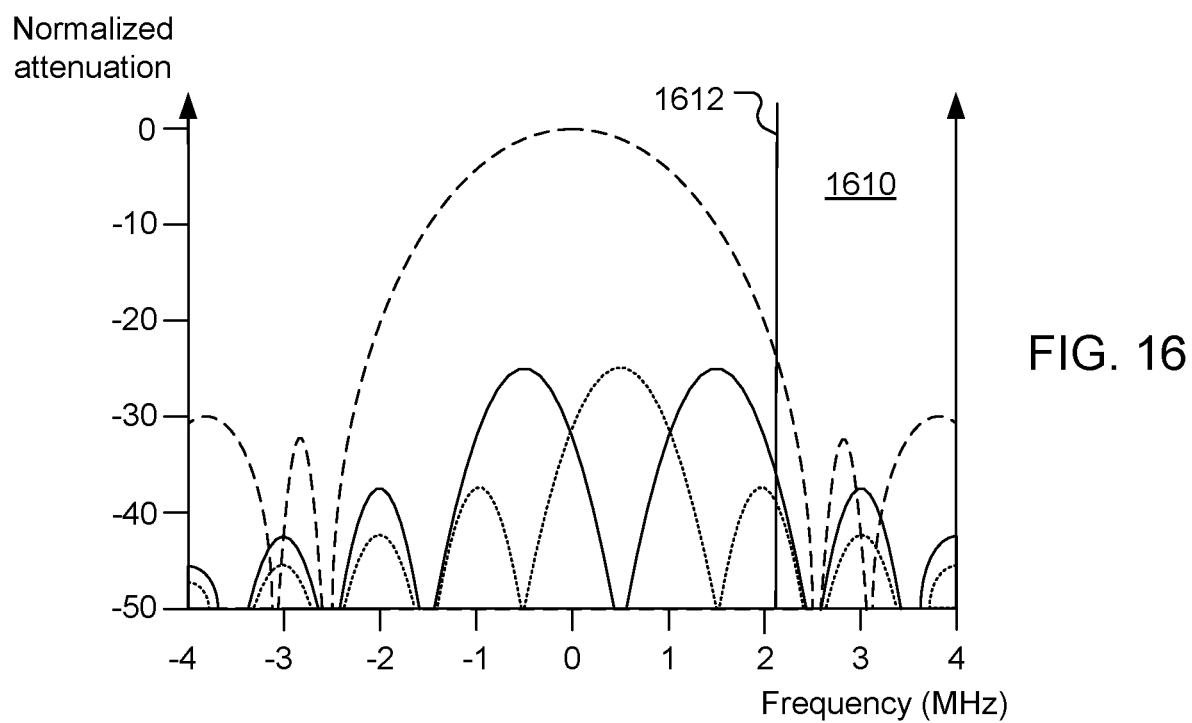
FIG. 16 is a diagram of the attenuation pattern shown in FIG. 15, and the normalized power distributions and interference region shown in FIG. 15 frequency shifted upward.

Referring also to FIGS. 15 and 16, the transmitter 1210 and the antenna 1220 may transmit signals that may cause interference in an upper frequency region of the signals 1310, 1320. The transmitter 1210 and the antenna 1220 may transmit one or more outbound signals that produce one or more signals with frequency(ies) in a region 1510, above an edge frequency 1512 of about +1.5 MHz from the center frequency, that may interfere with the signals 1310, 1320. For example, a second harmonic of each of one or more transmit signals in the B14 frequency band (e.g., 5 MHz mode, 10 MHz mode) may interfere with signals in a region 1510. As with the lower-band interference, the frequency shifter 1240 is configured to respond to the TX indicator signal 1260 indicating transmission of one or more signals that may induce interference with one or more of the signals 1310, 1320 by selectively shifting frequency of signals received by the SPS antenna 1230. The frequency shifter 1240 is configured to shift signals received by the SPS antenna 1230 upward, as shown in FIG. 16, in frequency based on the TX indicator signal 1260 indicating transmission of one or more outbound signals that may induce interference in an upper frequency range of the signals 1310, 1320, e.g., in the region 1510. In this example, the frequency shifter 1240 has shifted the signals 1310, 1320 upward 511.5 kHz (although other magnitudes of frequency shift may be used). Consequently, a new edge 1612 of a region 1610 of potential interference signals has been moved to a higher-attenuation portion (e.g., −24 or greater) than the edge frequency 1512 (e.g., about −12 dB). As discussed above, without the frequency shift, processing of both main lobes of the GAL E1 signal 1320 may include interference and thus result in poor accuracy of a determined position for the UE 1100 and/or a determined time. With the frequency shift, the UE 1100 may process both main lobes of the GAL E1 signal 1320, providing more energy processed, a better-resolution correlation peak may be determined and thus a better accuracy of a time of arrival of the signal 1320 and consequently a more accurate position estimate for the UE 1100 may be determined. Also or alternatively, a more accurate time may be determined.

Figure 17:
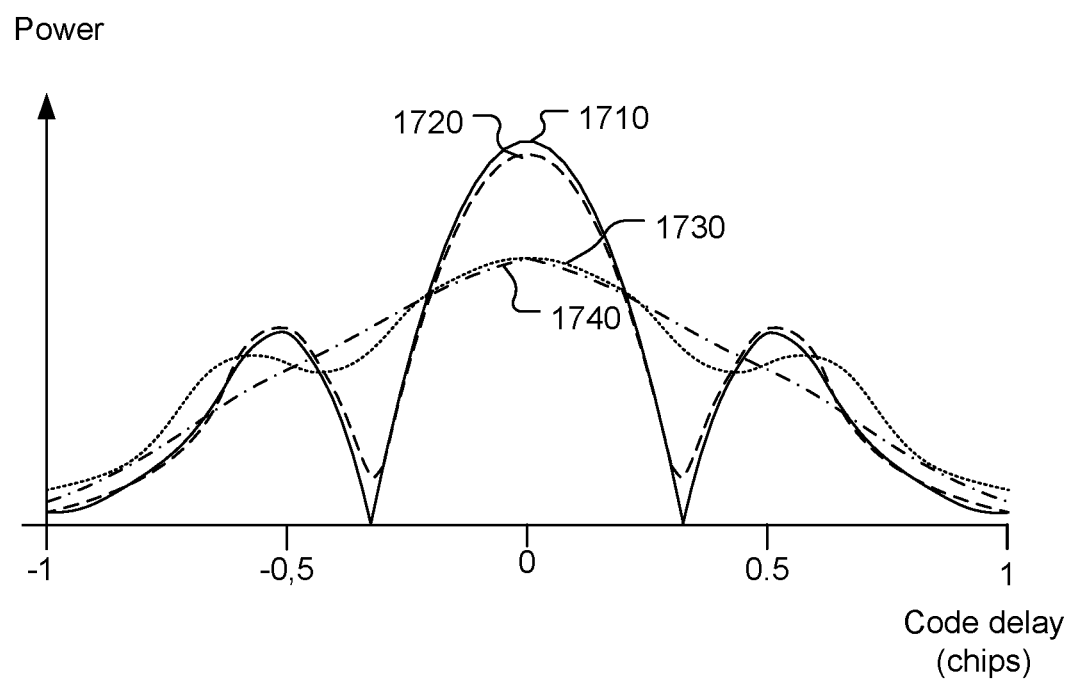
FIG. 17 is a power distribution diagram of correlation peaks for correlations using various signal portions.

Frequency shifting received signals relative to a frequency filter attenuation pattern may provide one or more advantages. For example, the frequency shifting may provide better interference signal rejection. As another example, the frequency shifting enables more of received SV signals to be processed. Referring also to FIG. 17, correlation peaks 1710, 1720 obtained by processing +/−2 MHz within the center frequency of BOC GAL E1C signals without and with the attenuation 1340 applied are both higher and narrower than a peak 1730 obtained by processing one BPSK GAL E1C signal main lobe and not the other main lobe. A more distinct correlation peak 1740 corresponding to processing of one of the two main lobes may be obtained by applying a finite impulse response (FIR) filter.

Figure 18:
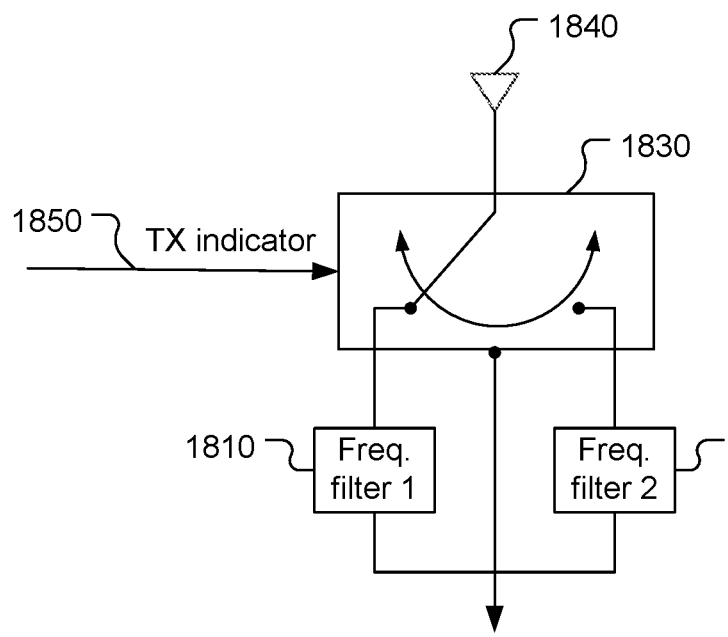
FIG. 18 is a block diagram of selective frequency filtering components of the user equipment shown in FIG. 11.

Other techniques may be used for the event-based interference unit 1160 to adjust attenuation applied to incoming signals. For example, referring also to FIG. 18, the UE 1100 may include frequency filters 1810, 1820, and a selector 1830, e.g., a switch, to selectively route signals received by an SPS antenna 1840 to one of the filters 1810, 1820 or to bypass the filters 1810, 1820. The filters 1810, 1820 may be configured to allow processing of desired frequency portions of SV signals and to suppress interference signals. For example, the frequency filter 1810 may be a bandpass filter (BPF) configured to pass a frequency range 1351 (FIG. 13) containing a higher-frequency main lobe of the GAL E1 C signal 1320. As another example, the frequency filter 1810 may be a BPF configured to pass a frequency range 1352 containing both main lobes of the GAL E1 C signal 1320 while suppressing signal frequencies outside the frequency range 1352. The frequency filter 1810 may be configured to pass a portion of a main lobe of the signal 1320. For example, the frequency filter 1810 may be a BPF configured to pass a frequency range 1353 containing a portion (that is less than all) of a lower-frequency main lobe of the signal 1320 and the higher-frequency main lobe of the signal 1320. This may help avoid interference while processing more energy of the signal 1310 (e.g., compared to using the range 1351) which may help improve positioning accuracy and/or time determination accuracy. The frequency filter 1810 may provide a pass band that is symmetrical (e.g., the frequency range 1352) or asymmetrical (e.g., the frequency range 1351, 1353) about the center frequency of the signal 1320. As another example, the frequency filter 1810 may be a high-pass filter (HPF) configured to pass a frequency range 1354 containing a portion (that is less than all) of a lower-frequency main lobe of the signal 1320 and higher frequencies (including the higher-frequency main lobe of the signal 1320), and suppress signal frequencies below the frequency range 1354. The selector 1830 is configured to select which of the filters 1810, 1820, or no filter, for the signals received by the SPS antenna 1840 based on a TX indicator 1850, e.g., indicative of expected interference based on outbound signal transmission by the transmitter 1210 and the antenna 1220. Similar to the frequency filter 1810, the frequency filter 1820 may be configured to pass SV signal frequencies and inhibit interference frequencies to facilitate accurate positioning of the UE 1100 and/or time determination. For example, the frequency filter 1820 may be configured to pass signals in frequency ranges 1551, 1552, 1553, 1554 (FIG. 15). Still other examples of frequency ranges providable by the frequency filter 1810 and/or the frequency filter 1820 for passing desired signal portions and suppressing undesired signals may be used. Also, while only two frequency filters are shown in FIG. 18, other quantities of frequency filters may be used. Also, TX indicators may be indicative of expected interference signals in a variety of ways. For example, a TX indicator may indicate one or more frequencies of one or more outbound signals being transmitted or to be transmitted, and/or may indicate one or more frequencies at which one or more signals (e.g., harmonic(s) and/or intermodulation signal(s)) may be induced due to transmission of one or more outbound signals. As another example, a TX indicator may indicate a frequency shift to be implemented and/or a frequency band to be passed and/or a frequency band to be suppressed (e.g., an indication to implement one of the frequency ranges 1351-1354 and/or one of the frequency ranges 1551-1554, or an indication of a frequency filter to apply, etc.).

Adjusting frequency of incoming signals and/or adjusting frequency filtering may be used for various split-spectrum signals, e.g., BOC signals centered at 1.57542 GHz (e.g., GAL E1, BDS (BeiDou Navigation Satellite System) B1C, GPS L1C), and may provide various advantages. For example, such techniques may provide improved signal processing accuracy. As another example, SV signals (e.g., GAL E1, BDS B1C, GPS L1C) may continue to be correlated during the presence of would-be interference (e.g., due to LTE B13 and/or LTE B14 interference) for better sensitivity. As another example, blanking of an SV signal, e.g., during WWAN transmission, may be avoided. As another example, a +/−511.5 kHz frequency shift of incoming signals may provide improved LTE signal rejection, reducing interference signal impact on a correlation peak and/or automatic gain control of the SV signals. As another example, a +/−511.5 kHz frequency shift of incoming signals, a GPS L1 signal may be processed at Cx4, saving buffer usage in sample memory (SM) (e.g., 64 Kbytes in acquisition and 8 KByts in tracking), enabling sharing of a common sample memory between GPS L1 and other L1-band signals, including GAL E1. As another example, each sideband (corresponding to a main lobe) of a BOC-modulated signal can be processed separately with BPSK modulation, e.g., by modifying a code-generator characteristic (e.g., a code generator with a BOC characteristic as discussed with respect to Equations (1)-(4)) or by modifying a chip-matched filter characteristic from BOC to BPSK. If an interference signal is present in one sideband and not the other, then the sideband without interference may be processed with BPSK modulation. Thus, a satellite may continue to be tracked despite the presence of an interference signal in the bandwidth of a satellite signal. As another example, the 1.023 MHz chip rate and few-millisecond code period of L1 signals facilitates fast acquisition. Being able to process a portion of such a signal in the presence of potential interference enables fast acquisition despite the interference. As another example, by processing a portion of an SV signal while interference is present in another portion of the SV signal, global geometry of satellites (GDOP-PDOP (geometric dilution of precision-position dilution of precision) may be maintained despite the presence of would-be interference. The UE 1100 can dynamically switch between processing a full-band SV signal and a partial-band SV signal to adapt to intermittent presence of interference.

Figure 19:
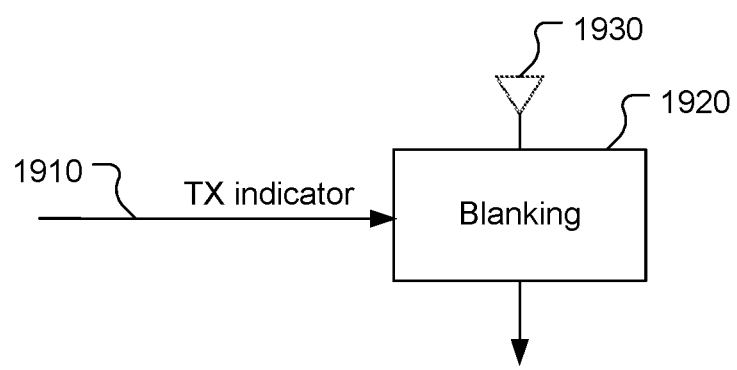
FIG. 19 is a block diagram of blanking components of the user equipment shown in FIG. 11.

Referring to FIG. 19, with further reference to FIGS. 2 and 11, the event-based interference unit 1160 may be configured to selectively blank incoming SV signals based on whether outbound signals will induce signals that will have significant impact upon processing of SV signals. For example, WWAN frequency bands may be very large, and WWAN signals may be transmitted on a small portion of a WWAN frequency band. Depending on what frequency(ies) of WWAN signal(s) is(are) transmitted, one or more interference signals of consequence (e.g., within a frequency band of a signal to be processed and of a magnitude to have a significant affect on the signal to be processed, e.g., causing an SINR (Signal to Interference and Noise Ratio) to be below a threshold) may or may not be produced. That is, within a WWAN band, the frequencies that may induce interference signals of consequence may be much narrower than the whole WWAN band. For example, some WWAN transmit concurrencies, including NR5G, may result in RF interference to GNSS constellations (e.g., GPS L1). To mitigate this interference, the event-based interference unit 1160 may send a TX indicator 1910 to a blanking unit 1920 that is configured to selectively blank SV signals received by an SPS antenna 1930, e.g., blanking the SV signals during WWAN transmission that will induce (or at least is expected to induce) interference of consequence and not blanking the SV signals absent a WWAN transmission corresponding to interference signals of consequence. The event-based interference unit 1160 may adjust, based on the amount of blanking (e.g., the number of samples of an SV signal that are blanked), one or more detection thresholds (e.g., for correlation peak) used by the SPS signal measurement unit 1150. The blanking provided by the blanking unit 1920 may be applied on a WWAN sub-band basis, that is, based on what sub-band of a WWAN band is being used for outbound signal transmission via the transceiver 1120 (e.g., the wireless transmitter 242 and the antenna 246). Selectively blanking may help avoid processing SV signals with interference (thus improving measurement accuracy and/or reducing latency) while avoiding blanking of SV signals based on outbound signal transmissions, e.g., of WWAN signals, that will not significantly interfere with the SV signals.

This selective blanking may be extended to multi-transmission scenarios, including for different technologies. The blanking may depend on a band combination of multiple transmitted signals as well as frequencies of the transmitted signals. For example, instead of blanking based on any LTE TDD ULCA (LTE Time Division Duplex Uplink Carrier Aggregation) transmission, blank selectively based on the multi-signal transmission inducing interference of consequence and avoid blanking otherwise. As another example, instead of blanking based on any LTE TDD ULCA (LTE Time Division Duplex Uplink Carrier Aggregation) transmission, or any LTE and NR5G NSA (New Radio 5G Non-Standalone) transmission, or any 5G NR CA/DC (Carrier Aggregation/Dual Connectivity) transmission, blank selectively based on the multi-signal transmission inducing interference of consequence and avoid blanking otherwise.

The blanking applied by the blanking unit 1920 may be any of a variety of blanking types. For example, the blanking unit 1920 may blank an SV signal by replacing the SV signal (i.e., the entire bandwidth of the SV signal) with a dithering pattern of a sequence of ON/OFF states of a power amplifier. As another example, the blanking unit 1920 may blank based on GSM or LTE TDD transmission, and/or based on LTE FDD (Frequency Division Duplex) B13/B14 transmission (for GAL E1 mitigation). As another example, the blanking unit 1920 may blank an SV signal based on (e.g., of SV signal samples taken during) DMRS (Demodulation Reference Signal) symbol transmission from LTE FDD transmission. As another example, the blanking unit 1920 may blank an SV signal based on Bluetooth® and/or WiFi signal transmission.

Selectively blanking an SV signal for outbound signal transmissions (e.g., WWAN signal transmissions) that are expected to induce significant SV signal interference and not blanking the SV signal for outbound signal transmissions that are not expected to induce significant SV signal interference may result in different noise floor measurements than would occur if blanking was performed for any outbound transmission, e.g., anywhere within a WWAN band. Blanking for interference-inducing WWAN transmissions (inducing interference of consequence) and not for non-interference-inducing WWAN transmissions should result in higher noise floor for WWAN transmissions. If blanking is performed for WWAN aggressor transmissions (that will induce interference of consequence) and not for non-aggressor WWAN transmissions (WWAN transmissions that will not induce interference of consequence), then the following should be true $$NF\_A \leq NF\_B < NF\_C \qquad (5)$$

where NF_A is a GNSS noise floor measured without WWAN transmission (e.g., of an aggressor or a non-aggressor), NF_B is the GNSS noise floor measured during non-aggressor WWAN transmission, and NF_C is the GNSS noise floor measured during aggressor WWAN transmission. If, however, blanking is performed for WWAN aggressor transmissions and for non-aggressor WWAN transmissions, then (because blanking raises the noise floor) the following should be true $$NF\_A < NF\_B \leq NF\_C \qquad (5)$$

Figure 20:
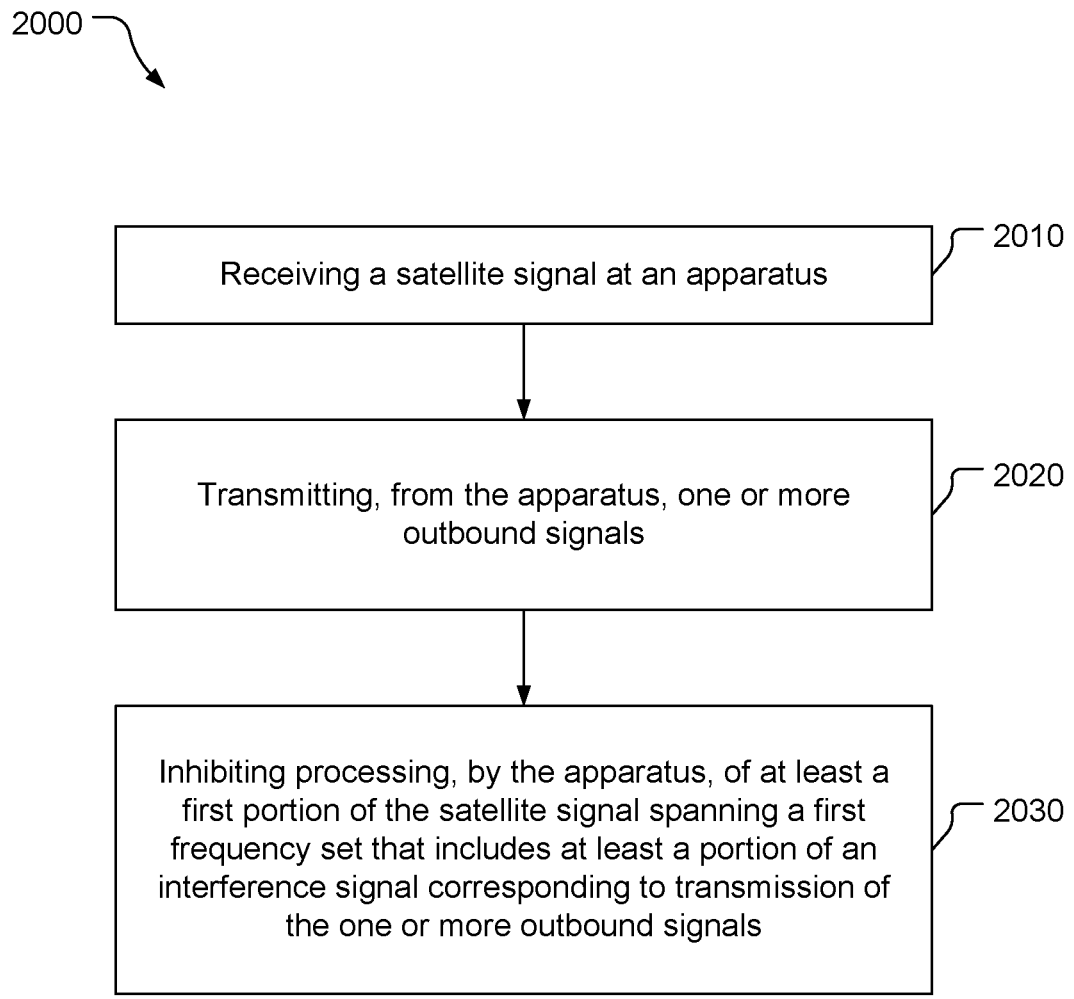
FIG. 20 is a block flow diagram of a satellite signal method.

Referring to FIG. 20, with further reference to FIGS. 1-19, a satellite signal method 2000 includes the stages shown. The method 2000 is, however, an example only and not limiting. The method 2000 may be altered, e.g., by having stages added, removed, rearranged, combined, performed concurrently, and/or having single stages split into multiple stages.

At stage 2010, the method 2000 includes receiving a satellite signal at an apparatus. For example, the UE 510 receives the satellite signal 525 (and the satellite signal 535). The transceiver 1120 (e.g., the antenna 262) may comprise means for receiving the satellite signal. As another example, the transceiver 1120 (e.g., the SPS receiver 217 and the antenna 262) and the processor 1110 may comprise means for receiving the satellite signal.

At stage 2020, the method 2000 includes transmitting, from the apparatus, one or more outbound signals. For example, the processor 1110 transmits one or more WWAN signals (e.g., LTE signal(s) and/or 5G signal(s)) via the transceiver 1120 (e.g., the wireless transmitter 242 and the antenna 246). The processor 1110, possibly in combination with the memory 1130, in combination with the transceiver 1120 (e.g., the wireless transmitter 242 and the antenna 246) may comprise means for transmitting the one or more outbound signals.

At stage 2030, the method 2000 includes inhibiting processing, by the apparatus, of at least a first portion of a satellite signal spanning a first frequency set that includes at least a portion of an interference signal corresponding to transmission of the one or more outbound signals. For example, the event-based interference unit 1160 may cause a frequency filtering of the satellite signal to be processed to inhibit a frequency band of the satellite signal from being processed, or may cause a blanking of one or more samples of the satellite signal to inhibit a time span of the satellite signal from being processed. For example, the event-based interference unit 1160 may provide an indication of outbound signal transmission and/or interference frequency (ies) and/or filtering to be applied to the satellite signal and/or blanking to be applied to the satellite signal and/or one or more other indications. The event-based interference unit 1160 may comprise the processor 1110 transmitting the one or more outbound signals via the transceiver 1120, with a transmission indication causing the frequency filtering or blanking. The processor 1110, possibly in combination with the memory 1130, possibly in combination with the frequency shifter 1240 and the frequency filter 1250, or the selector 1830, or the blanking unit 1920 may comprise means for inhibiting processing of at least the first portion of the satellite signal (e.g., to inhibit determination of a correlation peak using the first portion of the satellite signal).

Numerous examples of the method 2000 may be implemented. For example, as discussed with respect to FIG. 21, examples may be implemented where the first portion of the satellite signal is a frequency portion of the satellite signal. As another example, as discussed with respect to FIG. 22, examples may be implemented where the first portion of the satellite signal is a time portion of the satellite signal.

Figure 21:
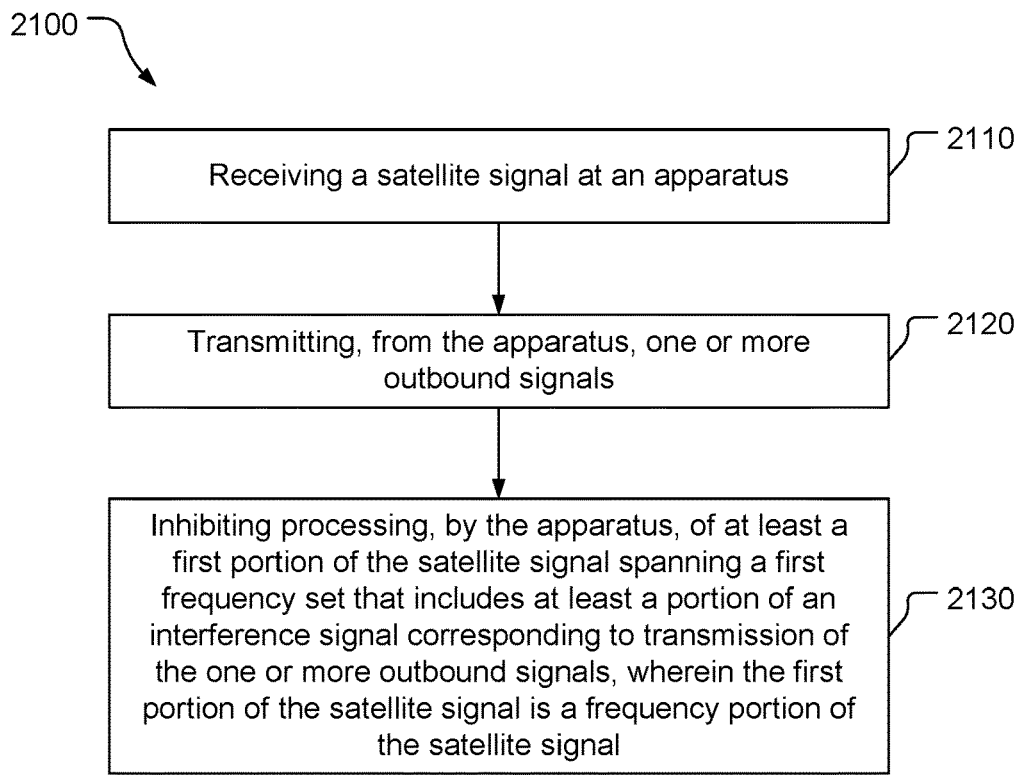
FIG. 21 is a block flow diagram of an example of the method shown in FIG. 20.

Referring to FIG. 21, with further reference to FIGS. 1-20, a satellite signal method 2100 includes the stages shown. The method 2100 is, however, an example only and not limiting. The method 2100 may be altered, e.g., by having stages added, removed, rearranged, combined, performed concurrently, and/or having single stages split into multiple stages. The method 2100 is an example of the method 2000, with stages 2110, 2120, 2130 corresponding to stages 2010, 2020, 2030, but with the first portion of the satellite signal being a frequency portion of the satellite signal.

Implementations of the method 2100 may include one or more of the following features. In an example implementation, inhibiting processing of at least the first portion of the satellite signal comprises actuating, based on transmission of the one or more outbound signals, a frequency filter to attenuate the portion of the interference signal and the first portion of the satellite signal. For example, the event-based interference unit 1160 may provide the TX indicator 1850 to the selector 1830 and the selector 1830 may select one of the frequency filters 1810, 1820 to be applied to the satellite signal and the interference signal(s) received by the SPS antenna 1840 to suppress the interference signal(s) and the corresponding frequency(ies) of the satellite signal. The processor 1110, possibly in combination with the memory 1130, in combination with the selector 1830 and the frequency filters 1810, 1820, may comprise means for inhibiting processing of at least the first portion of the satellite signal.

Also or alternatively, implementations of the method 2100 may include one or more of the following features. In an example implementation, the method 2100 further comprises processing a second portion of the satellite signal spanning a second frequency set, different from the first frequency set, to determine an arrival time of the satellite signal at the apparatus, wherein the first portion of the satellite signal and the second portion of the satellite signal are different frequency portions of a same time portion of the satellite signal. The first and second frequency sets are different in that, due to practical manufacturing considerations, some energy of the first portion and some energy of the second portion may be at the same frequency(ies), but the energy in the first portion will be so low relative to the energy in the second portion as to be negligible (e.g., below a threshold such as −20 dB or −30 dB relative to the second portion). The first and second frequency sets may not be perfectly separated, but one set is attenuated (e.g., by a filter) to have negligible contribution to signal measurements. The processor 1110, e.g., the SPS signal measurement unit 1150, may determine the arrival time by correlating the satellite signal with a reference signal and finding a timing of a correlation peak. The processor 1110, possibly in combination with the memory 1130, may comprise means for processing the second portion of the satellite signal. In another example implementation, the satellite signal is a split-spectrum modulation signal including a first main lobe and a second main lobe, and the first frequency set includes a first portion of the second main lobe and the second frequency set includes a second portion of the second main lobe. For example, the satellite signal may be the GAL E1 signal 1310, the second frequency set may be the frequency range 1553 or the frequency range 1554, and the first frequency set may comprise frequencies above the frequency ranges 1553, 1554. As another example, the satellite signal may be the GAL E1 signal 1310, the second frequency set may be the frequency range 1353 or the frequency range 1354, and the first frequency set may comprise frequencies below the frequency ranges 1353, 1354. While these examples have the first and second frequency sets abutting each other, the first and second frequency sets may be spaced apart (i.e., with some gap in frequencies between them). In another example implementation, the satellite signal is a split-spectrum modulation signal including a first main lobe and a second main lobe, and wherein the first frequency set includes at least some of the second main lobe and the second frequency set excludes the second main lobe. For example, the satellite signal may be the GAL E1 signal 1310, the second frequency set may be the frequency range 1551, and the first frequency set may comprise frequencies above the frequency range 1553. As another example, the satellite signal may be the GAL E1 signal 1310, the second frequency set may be the frequency range 1351, and the first frequency set may comprise frequencies below the frequency range 1353.

Also or alternatively, implementations of the method 2100 may include one or more of the following features. In an example implementation, inhibiting processing of at least the first portion of the satellite signal comprises: frequency shifting, based on transmission of the one or more outbound signals, the interference signal to produce a frequency-shifted interference signal such that the frequency-shifted interference signal is in a higher-attenuation frequency span of a frequency filter of the apparatus than the interference signal; and applying the frequency filter to the frequency-shifted interference signal. For example, the frequency shifter 1240 may respond to the TX indicator signal 1260 by shifting the interference signal(s), and the satellite signal, in frequency, e.g., to suppress the interference signal more than without the frequency shift, by moving the interference signal into a region of the attenuation 1340 provided by the frequency filter 1250 that will attenuate the interference signal(s) more than without the frequency shifting. The frequency shifter 1240 may comprise means for frequency shifting the interference signal. The frequency filter 1250 may comprise means for applying the frequency filter to the frequency-shifted interference signal.

Figure 22:
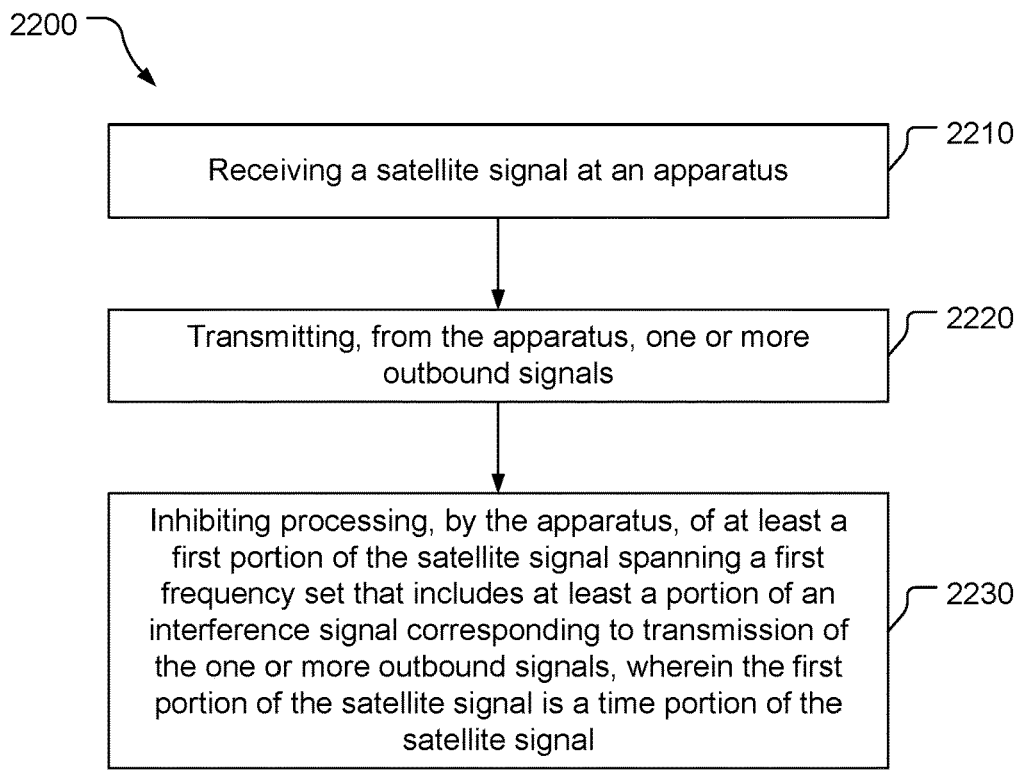
FIG. 22 is a block flow diagram of another example of the method shown in FIG. 20.

Referring to FIG. 22, with further reference to FIGS. 1-20, a satellite signal method 2200 includes the stages shown. The method 2200 is, however, an example only and not limiting. The method 2200 may be altered, e.g., by having stages added, removed, rearranged, combined, performed concurrently, and/or having single stages split into multiple stages. The method 2200 is an example of the method 2000, with stages 2210, 2220, 2230 corresponding to stages 2010, 2020, 2030, with the first portion of the satellite signal being a time portion of the satellite signal.

Implementations of the method 2200 may include one or more of the following features. In an example implementation, inhibiting processing of at least the first portion of the satellite signal comprises blanking the satellite signal for a time period corresponding to transmission of the one or more outbound signals based on one or more sub-bands of the one or more outbound signals. For example, the blanking unit 1920 may respond to the TX indicator 1910 being indicative of transmission of one or more WWAN signals that, due to the sub-band(s) of the WWAN signal(s) will induce interference of consequence for an SV signal by blanking the SV signal for the duration of the WWAN signal transmission. The blanking unit 1920, may comprising means for blanking the satellite signal.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. An apparatus comprising:
a transceiver configured to receive a satellite signal and to transmit one or more outbound signals, the satellite signal being a split-spectrum signal;
a memory; and
a processor, communicatively coupled to the transceiver and the memory, configured to:
transmit, via the transceiver, the one or more outbound signals;
selectively process, based on at least a portion of an interference signal corresponding to transmission of the one or more outbound signals by the transceiver, a portion of the satellite signal.

2. The apparatus of claim 1, wherein the portion of the satellite signal is a second portion of the satellite signal, wherein the first portion of the satellite signal is a frequency portion of the satellite signal, and wherein to selectively process the second portion of the satellite signal the processor is configured to process the second portion of the satellite signal, spanning a second frequency set that is different from the first frequency set, to determine an arrival time of the satellite signal at the apparatus, wherein the first portion of the satellite signal and the second portion of the satellite signal are different frequency portions of a same time portion of the satellite signal.

3. The apparatus of claim 2, wherein the satellite signal includes a first main lobe and a second main lobe, and wherein the first frequency set includes a first portion of the second main lobe and the second frequency set includes a second portion of the second main lobe.

4. The apparatus of claim 2, wherein the satellite signal includes a first main lobe and a second main lobe, and wherein the first frequency set includes at least some of the second main lobe and the second frequency set excludes the second main lobe.

5. The apparatus of claim 1, wherein the portion of the satellite signal is a second portion of the satellite signal, and wherein the processor is further configured to inhibit processing, in response to an indication for the transceiver to transmit the one or more outbound signals, of at least a first portion of the satellite signal spanning a first frequency set that includes the portion of the interference signal.

6. The apparatus of claim 5, wherein the first portion of the satellite signal is a frequency portion of the satellite signal, the apparatus further comprises a frequency filter, and wherein to inhibit processing of at least the first portion of the satellite signal, the processor is configured to actuate, based on transmission of the one or more outbound signals, the frequency filter to attenuate the portion of the interference signal and the first portion of the satellite signal.

7. The apparatus of claim 5, wherein the first portion of the satellite signal is a frequency portion of the satellite signal, the apparatus further comprises a frequency filter, and wherein to inhibit processing of at least the first portion of the satellite signal, the processor is configured to frequency shift, based on transmission of the one or more outbound signals, the interference signal to produce a frequency-shifted interference signal such that the frequency-shifted interference signal is in a higher-attenuation frequency span of the frequency filter than the interference signal.

8. The apparatus of claim 5, wherein the first portion of the satellite signal is a time portion of the satellite signal, and wherein to inhibit processing of at least the first portion of the satellite signal, the processor is configured to blank the satellite signal for a time period corresponding to transmission of the one or more outbound signals based on one or more sub-bands of the one or more outbound signals.

9. The apparatus of claim 1, wherein to selectively process the portion of the satellite signal the processor is configured to frequency shift the portion of the satellite signal.

10. A satellite signal method comprising:
receiving a satellite signal at an apparatus, the satellite signal being a split-spectrum signal;
transmitting, from the apparatus, one or more outbound signals; and
selectively processing, based on at least a portion of an interference signal corresponding to transmission of the one or more outbound signals, a portion of the satellite signal.

11. The method of claim 10, wherein the portion of the satellite signal is a second portion of the satellite signal, wherein the first portion of the satellite signal is a frequency portion of the satellite signal, and wherein selectively processing the second portion of the satellite signal comprises processing the second portion of the satellite signal, spanning a second frequency set that is different from the first frequency set, to determine an arrival time of the satellite signal at the apparatus, wherein the first portion of the satellite signal and the second portion of the satellite signal are different frequency portions of a same time portion of the satellite signal.

12. The method of claim 11, wherein the satellite signal includes a first main lobe and a second main lobe, and wherein the first frequency set includes a first portion of the second main lobe and the second frequency set includes a second portion of the second main lobe.

13. The method of claim 11, wherein the satellite signal includes a first main lobe and a second main lobe, and wherein the first frequency set includes at least some of the second main lobe and the second frequency set excludes the second main lobe.

14. The method of claim 10, wherein the portion of the satellite signal is a second portion of the satellite signal, and wherein the method further comprises inhibiting processing, by the apparatus, in response to an indication to transmit the one or more outbound signals, of at least a first portion of the satellite signal spanning a first frequency set that includes the portion of the interference signal.

15. The method of claim 14, wherein the first portion of the satellite signal is a frequency portion of the satellite signal, and wherein inhibiting processing of at least the first portion of the satellite signal comprises actuating, based on transmission of the one or more outbound signals, a frequency filter to attenuate the portion of the interference signal and the first portion of the satellite signal.

16. The method of claim 14, wherein the first portion of the satellite signal is a frequency portion of the satellite signal, and wherein inhibiting processing of at least the first portion of the satellite signal comprises:
frequency shifting, based on transmission of the one or more outbound signals, the interference signal to produce a frequency-shifted interference signal such that the frequency-shifted interference signal is in a higher-attenuation frequency span of a frequency filter of the apparatus than the interference signal; and
applying the frequency filter to the frequency-shifted interference signal.

17. The method of claim 14, wherein the first portion of the satellite signal is a time portion of the satellite signal, and wherein inhibiting processing of at least the first portion of the satellite signal comprises blanking the satellite signal for a time period corresponding to transmission of the one or more outbound signals based on one or more sub-bands of the one or more outbound signals.

18. The method of claim 10, wherein selectively processing the portion of the satellite signal comprises frequency shifting the portion of the satellite signal.

19. An apparatus comprising:
means for receiving a satellite signal, the satellite signal being a split-spectrum signal;
means for transmitting one or more outbound signals; and
means for selectively processing, based on at least a portion of an interference signal corresponding to transmission of the one or more outbound signals, a portion of the satellite signal.

20. The apparatus of claim 19, wherein the portion of the satellite signal is a second portion of the satellite signal, wherein the first portion of the satellite signal is a frequency portion of the satellite signal, and wherein the means for selectively processing the second portion of the satellite signal comprise means for processing the second portion of the satellite signal, spanning a second frequency set that is different from the first frequency set, to determine an arrival time of the satellite signal at the apparatus, wherein the first portion of the satellite signal and the second portion of the satellite signal are different frequency portions of a same time portion of the satellite signal.

21. The apparatus of claim 20, wherein the satellite signal is a includes a first main lobe and a second main lobe, and wherein the first frequency set includes a first portion of the second main lobe and the second frequency set includes a second portion of the second main lobe.

22. The apparatus of claim 20, wherein the satellite signal is a includes a first main lobe and a second main lobe, and wherein the first frequency set includes at least some of the second main lobe and the second frequency set excludes the second main lobe.

23. The apparatus of claim 19, wherein the portion of the satellite signal is a second portion of the satellite signal, and wherein the apparatus further comprises means for inhibiting processing, in response to an indication to transmit the one or more outbound signals, of at least a first portion of the satellite signal spanning a first frequency set that includes the portion of the interference signal.

24. The apparatus of claim 23, wherein the first portion of the satellite signal is a frequency portion of the satellite signal, and wherein the means for inhibiting processing of at least the first portion of the satellite signal comprise means for actuating, based on transmission of the one or more outbound signals, a frequency filter to attenuate the portion of the interference signal and the first portion of the satellite signal.

25. The apparatus of claim 23, wherein the first portion of the satellite signal is a frequency portion of the satellite signal, and wherein the means for inhibiting processing of at least the first portion of the satellite signal comprise:
  means for frequency shifting, based on transmission of the one or more outbound signals, the interference signal to produce a frequency-shifted interference signal such that the frequency-shifted interference signal is in a higher-attenuation frequency span of a frequency filter of the apparatus than the interference signal; and
  means for applying the frequency filter to the frequency-shifted interference signal.

26. The apparatus of claim 23, wherein the first portion of the satellite signal is a time portion of the satellite signal, and wherein the means for inhibiting processing of at least the first portion of the satellite signal comprise means for blanking the satellite signal for a time period corresponding to transmission of the one or more outbound signals based on one or more sub-bands of the one or more outbound signals.

27. The apparatus of claim 19, wherein the means for selectively processing the portion of the satellite signal comprise means for frequency shifting the portion of the satellite signal.

28. A non-transitory, processor-readable storage medium comprising processor-readable instructions to cause a processor of an apparatus to:
  receive a satellite signal, the satellite signal being a split-spectrum signal;
  transmit one or more outbound signals; and
  selectively process, based on at least a portion of an interference signal corresponding to transmission of the one or more outbound signals, a portion of the satellite signal.

29. The storage medium of claim 28, wherein the portion of the satellite signal is a second portion of the satellite signal, wherein the first portion of the satellite signal is a frequency portion of the satellite signal, and processor-readable instructions to cause the processor to selective process the satellite signal comprise processor-readable instructions to cause the processor to process the second portion of the satellite signal, spanning a second frequency set that is different from the first frequency set, to determine an arrival time of the satellite signal at the apparatus, wherein the first portion of the satellite signal and the second portion of the satellite signal are different frequency portions of a same time portion of the satellite signal.

30. The storage medium of claim 29, wherein the satellite signal includes a first main lobe and a second main lobe, and wherein the first frequency set includes a first portion of the second main lobe and the second frequency set includes a second portion of the second main lobe.

31. The storage medium of claim 29, wherein the satellite signal includes a first main lobe and a second main lobe, and wherein the first frequency set includes at least some of the second main lobe and the second frequency set excludes the second main lobe.

32. The storage medium of claim 28, wherein the portion of the satellite signal is a second portion of the satellite signal, and wherein the storage medium further comprises processor-readable instructions to cause the processor to inhibit processing, in response to an indication to transmit the one or more outbound signals, of at least a first portion of the satellite signal spanning a first frequency set that includes the portion of the interference signal.

33. The storage medium of claim 32, wherein the first portion of the satellite signal is a frequency portion of the satellite signal, and wherein the processor-readable instructions to cause the processor to inhibit processing of at least the first portion of the satellite signal comprise processor-readable instructions to cause the processor to actuate, based on transmission of the one or more outbound signals, a frequency filter to attenuate the portion of the interference signal and the first portion of the satellite signal.

34. The storage medium of claim 32, wherein the first portion of the satellite signal is a frequency portion of the satellite signal, and wherein the processor-readable instructions to cause the processor to inhibit processing of at least the first portion of the satellite signal comprise:
  processor-readable instructions to cause the processor to frequency shift, based on transmission of the one or more outbound signals, the interference signal to produce a frequency-shifted interference signal such that the frequency-shifted interference signal is in a higher-attenuation frequency span of a frequency filter of the apparatus than the interference signal; and
  processor-readable instructions to cause the processor to apply the frequency filter to the frequency-shifted interference signal.

35. The storage medium of claim 32, wherein the first portion of the satellite signal is a time portion of the satellite signal, and wherein the processor-readable instructions to cause the processor to inhibit processing of at least the first portion of the satellite signal comprise processor-readable instructions to cause the processor to blank the satellite signal for a time period corresponding to transmission of the one or more outbound signals based on one or more subbands of the one or more outbound signals.

36. The storage medium of claim 28, wherein the processor-readable instructions to cause the processor to selectively process the portion of the satellite signal comprise processor-readable instructions to cause the processor to frequency shift the portion of the satellite signal.

\* \* \* \* \*